(12) United States Patent
McCann et al.

(10) Patent No.: US 9,315,273 B2
(45) Date of Patent: Apr. 19, 2016

(54) APPARATUS FOR SUPPORTING A PARACHUTE FLIGHT CONTROLLER AND FLIGHT CONTROLLER FOR A PARACHUTE

(75) Inventors: Sean McCann, Ottawa (CA); Peter Baumeister, Ottawa (CA)

(73) Assignee: Mist Mobility Integrated Systems Technology, Inc., Ontario (CA)

( * ) Notice: Subject to any disclaimer, the term of this patent is extended or adjusted under 35 U.S.C. 154(b) by 815 days.

(21) Appl. No.: 13/320,672

(22) PCT Filed: May 17, 2010

(86) PCT No.: PCT/CA2010/000728
§ 371 (c)(1),
(2), (4) Date: Mar. 2, 2012

(87) PCT Pub. No.: WO2010/130043
PCT Pub. Date: Nov. 18, 2010

(65) Prior Publication Data
US 2012/0145833 A1 Jun. 14, 2012

Related U.S. Application Data

(60) Provisional application No. 61/178,746, filed on May 15, 2009.

(51) Int. Cl.
*B64D 17/00* (2006.01)
*B64D 17/02* (2006.01)
*B64D 17/34* (2006.01)

(52) U.S. Cl.
CPC .......... *B64D 17/025* (2013.01); *B64D 17/343* (2013.01)

(58) Field of Classification Search
USPC ........................ 244/152, 151 B, 151 A, 142
See application file for complete search history.

(56) References Cited

U.S. PATENT DOCUMENTS 5,584,449 A * 12/1996 Kavanagh .................. 244/99
5,884,867 A    3/1999 Gordon et al.
(Continued)

FOREIGN PATENT DOCUMENTS

| CA | 2469680 A1 | 7/2003 |
| DE | 3913133 A1 | 12/1989 |
| JP | 5096063 A | 4/1993 |

OTHER PUBLICATIONS

International Search Report and Written Opinion for corresponding PCT Application No. PCT/CA2010/000728, Jul. 15, 2010, 9 pages.

*Primary Examiner* — Brian M O'Hara
*Assistant Examiner* — Keith L Dixon
(74) *Attorney, Agent, or Firm* — McDonnell Boehnen Hulbert & Berghoff LLP

(57) ABSTRACT

An apparatus for supporting a parachute flight controller from a parachute comprises a bearing member, for example a pulley, a load-bearing coupling, for example a harness, connected to the bearing member and including a connector for connecting the coupling to a parachute flight controller. The coupling includes a load-bearing connector for connecting a payload thereto, and the bearing member is adapted to enable relative movement, controlled by the flight controller, between the bearing member and a support member, for example a flexible coupling line or web for supporting the bearing member connected between first and second suspension lines of a parachute. The flight controller may include one or more control lines connected to the support member or suspension lines which can be wound in or out of the flight controller to effect relative movement between the bearing member and the support member and thereby control the direction of the parachute.

20 Claims, 41 Drawing Sheets

(56) References Cited

U.S. PATENT DOCUMENTS

| | | | |
|---|---|---|---|
| 5,901,924 A * | 5/1999 | Strieber | 244/13 |
| 5,904,324 A * | 5/1999 | Di Bella | 244/152 |
| 6,505,793 B2 * | 1/2003 | Schwarzler | 244/142 |
| 6,808,144 B1 * | 10/2004 | Nicolai et al. | 244/139 |
| 7,059,570 B2 | 6/2006 | Strong | |
| 2004/0026570 A1 | 2/2004 | Preston | |
| 2005/0230555 A1 | 10/2005 | Strong | |

* cited by examiner

FIG. 22A  FIG. 22B

APPARATUS FOR SUPPORTING A PARACHUTE FLIGHT CONTROLLER AND FLIGHT CONTROLLER FOR A PARACHUTE

RELATED APPLICATIONS

This application claims the benefit of and is a National Phase Entry of International Application Number PCT/CA2010/000728 filed May 17, 2010, and claims the benefit of U.S. Provisional Patent Application No. 61/178,746 filed on May 15, 2009, both of which are hereby incorporated by reference in their entirety.

FIELD OF THE INVENTION

The present invention relates to flight or guidance controllers for parachutes and other drag devices, and in particular, but not limited to flight controllers that enable parachutes with payloads to be steered according to a desired flight path towards a desired target location.

BACKGROUND OF THE INVENTION

Equipment, supplies and other items may be efficiently delivered to a desired location by dropping them from aircraft and using parachutes to slow their descent to bring them safely to ground. This method of deployment removes the need for the aircraft to land, which might not be possible or convenient, depending on the terrain and availability of a suitable runway and ground support. The parachute guidance system may be used to steer the parachute and its cargo towards a desired location during its flight. An example of an aerial delivery device having a parachute guidance system is described in U.S. Pat. No. 7,059,570 to Strong. The delivery device includes an overloaded ram-air drogue parachute that is controlled by a guidance system to steer the payload towards an intended target. At a selected altitude, a round, recovery parachute is activated, the drogue parachute collapses and the payload descends the remaining distance under the recovery parachute. The guidance system includes a control unit that is suspended from the drogue parachute and includes two control lines connected to left and right steering lines of the parachute. The control lines are wound on a respective winch spool each driven by a motor which lets the control lines in and out thereby controlling the steering lines and the direction of the parachute. The guidance control unit is connected to a mounting plate which is connected to the parachute suspension lines by risers. The lower part of the mounting plate has a connector for connecting a payload therethrough via a riser. The control unit also controls the deployment of the recovery parachute and for this purpose, includes a motorized winch spool that pulls in the rip cord of the recovery parachute once the payload has reached the desired altitude. The recovery parachute, which is not steered, then descends the remaining distance to the ground.

Another example of a steerable parachute and control system is disclosed in CA 2,469,680. The parachute system includes both a ram-air drogue parachute and a round recovery or landing parachute. During descent, the control system steers the ram-air parachute to a position substantially overhead of the target and subsequently controls the ram-air parachute to adopt a spiral descent pattern. At a predetermined height above ground, the guidance parachute is released and automatically deploys the landing parachute by static line. Thereafter, the unsteered landing parachute and payload continues its descent to the ground.

SUMMARY

According to one aspect of the present invention, there is provided an apparatus for supporting a parachute flight controller from a parachute, the apparatus comprising a bearing member, a load-bearing coupling connected to the bearing member and including a connector for connecting the coupling to a flight controller, wherein the coupling includes a load-bearing connector for connecting a payload thereto, and the bearing member is adapted to enable relative movement, controlled by said flight controller, between said bearing member and a support member for supporting said bearing member connected between first and second suspension lines of a parachute.

This arrangement enables the mechanism of a flight controller that controls the direction of a parachute to be removed from the load path between the parachute and its payload. Thus, rather than the payload being connected to the parachute through control lines of a flight controller, the payload can be independently connected to the parachute and supported thereby through the bearing member and the support member. The arrangement allows the control lines or another mechanism of the flight controller to control relative movement between the bearing member and the support member so that the length of the support member on either side of the bearing member can be varied, which in turn results in relative vertical displacement between the first and second suspension lines and corresponding vertical displacement of the portion of the parachute canopy to which they are attached. Advantageously, by removing the control mechanism of the flight controller from the load path, the mechanism can be less robust and made from smaller and light components thereby enabling the flight controller to be lighter and more compact. In turn, this enables a larger payload to be accommodated within a given volume allocated to a payload package including the parachute, flight controller and payload. This arrangement also potentially allows heavier payloads to be carried by the parachute.

In some embodiments, the bearing member is rotatable to enable the relative movement, is rotatably coupled to the coupling and may comprise, for example, a pulley wheel having a circumferential groove or channel for receiving the support member therein. Alternatively, or in addition, the bearing member may be a slideable bearing adapted to permit slideable movement between itself and the support member.

In some embodiments, the apparatus includes a retainer for retaining the bearing member on the support member. The retainer with the bearing member may together define a closed or partially closed passage for the support member to pass therethrough.

In some embodiments, the apparatus may further include the support member, which may be flexible and in some embodiments may comprise an elongate flexible web, cable, line or rope for connection between the first and second suspension lines. In other embodiments, the support member may be part of the suspension lines.

In some embodiments, a limiter may be provided for limiting the extent of travel of the bearing member along the support member. The limiter may be adapted to protect the flight controller control mechanism from the load path during deployment of the parachute, for example. In some embodiments, the limiter comprises a releasable coupling for releasably coupling first and second spaced apart portions of the support member and/or suspension lines together. In some embodiments, the releasable coupling may be released by a control line of the flight controller.

In some embodiments, the bearing member comprises a first bearing member, and the apparatus further includes a second bearing member adapted to enable relative movement between the second bearing member and a second support member for supporting the second bearing member connected between third and fourth suspension lines of the parachute. In some embodiments, the second bearing member is rotatable to enable the relative movement and may comprise a second pulley wheel have a circumferential groove or channel for receiving the second support member therein.

In some embodiments, the first and second bearing members are angled or capable of being angled relative to each other to enable relative movement between the bearing members and the respective first and second support members when the support members are oriented in different directions, for example, in substantially orthogonal directions. In this arrangement, the second bearing member also enables part of the payload to be supported directly through suspension lines of the parachute so that the mechanism of the flight controller for controlling the direction of the parachute can be removed from the load path. Each of the first, second, third and fourth suspension lines may be associated with different quadrants of a parachute canopy (for example, a circular parachute canopy) with the first and second suspension lines being associated with a first pair of opposite quadrants and the third and fourth suspension lines being associated with the second pair of opposite quadrants. Relative movement between the second bearing member and the second support member allows relative vertical displacement between the third and fourth suspension lines and a corresponding relative vertical displacement between the portions of the parachute canopy to which they are attached.

In some embodiments, the apparatus further includes a support structure for supporting both the first and second bearing members thereon. The support structure may be adapted to enable the first and second bearing members to be mounted thereon so that the first and second bearing members adopt a predetermined, possibly fixed orientation relative to one another, for example, an orientation of substantially 90°. Other embodiments may allow the orientation between bearing members to be varied, for example by mounting one or both on a swivel. In some embodiments, the first and second bearing members may be mounted on the support structure one above the other. Where the first and second bearing members are rotatable about a respective axis, the first and second bearing members may be mounted one above the other so that a vertical axis through the intersection of their respective axes passes through both the first and second bearing members.

In some embodiments, a second limiter is provided for limiting the extent of travel of the second bearing member along the second support member, and the second limiter may include similar features to those described above in connection with the first limiter.

In some embodiments, the connector for connecting the coupling to the flight controller is adapted for releasably connecting the flight controller thereto. The connector may comprise a manually operable releasable member, for example a lever, button or other mechanical interface, moveable between a first position which locks the flight controller to the connector and a second position which enables the flight controller to be released from the connector. In some embodiments, the connector comprises a plurality of couplers each for supporting a separate module of a modular flight controller.

In some embodiments, the apparatus further includes the flight controller, wherein the flight controller comprises control means for causing the relative movement between the bearing member and the support member. In some embodiments, the control means includes pulley means for accommodating at least one of (1) a control line for applying a force on the first suspension line and (2) a control line for applying a force on the second suspension line, and drive means for driving rotation of the pulley means to wind and unwind the control line about the pulley means. The control line for applying a force on the second suspension line may be part of the same control line for applying a force on the first suspension line or the control lines may be separate control lines. In some embodiments, the apparatus may further include a control line for applying a force on the first suspension line and a control line for applying a force on the second suspension line, and the control lines may be oppositely wound on the pulley means so that on rotation of the pulley means in a first direction, one of the control lines is reeled in and the other control line is reeled out. In this case, one of the suspension lines will move up and the other will move down. Upward movement of one of the suspension lines is assisted by the tension between the canopy and the payload and this upward force can be used to offset and reduce the force required to pull the other suspension line downwards, thereby providing a simple means of conserving energy in comparison to a system in which the pulley means comprises independently rotatable first and second pulleys for each control line.

In some embodiments, the pulley means comprises first pulley means for accommodating a first control line for applying a force to the first suspension line and second pulley means for accommodating a second control line for applying a force to the second suspension line. Each pulley means includes at least a hub for accommodating the control lines and may further include a flange for one or more sides of the hub to define a channel for the control line. In some embodiments, a releasable coupler may be provided for releasably coupling at least one of the first and second pulley means from the drive means. In some embodiments, the drive means includes a rotary shaft, the first pulley means is adapted for mounting on the rotary shaft and the releasable coupler includes means for releasably coupling the second pulley means to one or both of the first pulley means and the rotary shaft.

In some embodiments, the flight controller includes a housing for accommodating the pulley means, and wherein the housing includes an access opening through which at least a portion of the pulley means may be removed from the housing, and a releasable closure for closing the access opening. For example, the access opening may enable one or both pulleys for first and second control lines to be removed therethrough. Advantageously, the provision of an access opening having a releasable closure enables the pulley system to be readily reconfigured in the field, for example, by completely removing one of the pulleys to adapt the flight controller for a different parachute (e.g. from a round parachute to a square or ram-air parachute) and/or to enable the interchange between pulleys of various sizes, for example, pulleys having different diameter hubs.

Thus, in some embodiments, the apparatus further includes a set of pulleys, wherein each pulley of the set includes at least a hub about which a control line is wound and at least one hub of a pulley in the set has a diameter that is different from a diameter of a hub of another pulley in the set. Adapting the flight controller for the interchange between different pulleys allows the flight controller to be adapted for different applications so that the same flight controller can be used for different parachutes and different payloads, for example. A pulley having a larger diameter hub will require fewer turns than a smaller hub pulley to reel in or out the same length of control line, whereas the force required to reel in a control line will be less for a smaller hub pulley.

In some embodiments, the flight controller includes means for applying a force on the third and fourth suspension lines to provide relative movement between the second support member and the second bearing member. The means for applying a force may comprise means for varying the length of a control line for applying a force to the third suspension line and for varying the length of a control line for applying a force to the fourth suspension line. The means for varying the length of a control line may comprise pulley means for accommodating a control line.

In some embodiments, the pulley means comprises third pulley means for accommodating a third control line for applying a force to the third suspension line and a fourth pulley means for accommodating a fourth control line for applying a force to the fourth suspension line, and drive means for driving rotation of the pulley means.

The drive means for controlling vertical displacement of the third and fourth suspension lines may be separate and independently controllable from the drive means used to control relative vertical displacement of the first and second suspension lines of the parachute. The pulley means for the third and fourth suspension lines may have any one or more features described above in connection with the pulley means used for controlling the first and second suspension lines.

In some embodiments, the flight controller includes an access opening to enable at least a portion of the pulley means for the third and fourth suspension lines to be removed from the housing therethrough. A releasable closure may be provided for closing the access opening. The releasable closure may be the same or a different closure from that used to close an access opening for removing at least a portion of the pulley means associated with control lines for controlling the first and second suspension lines.

In some embodiments, the flight controller comprises a plurality of modular units, each modular unit having a discrete housing for one or more components of the flight controller. In some embodiments, the flight controller may include a first modular unit for accommodating a mechanism for applying a force on the first and second suspension lines to provide relative movement between the bearing member and the support member, and a second modular unit which accommodates a controller for controlling the relative movement. The controller may for example include a plurality of electronic components, which may include a processor, and the second modular unit may be adapted to generate control signals and/or provide power to the first unit for driving the mechanism in the first unit. The second unit may further include a source of power, for example a battery for driving the mechanism in the first unit. In other embodiments, the power source may be accommodated in the first modular unit and/or in a third modular unit.

In some embodiments, the flight controller includes an interface for passing electrical signals and/or electrical power between the second unit and the first unit, wherein the interface comprises a connector having first and second parts which mate together to form an electrical connection, wherein the first part is mounted on the first unit and the second part is mounted on the second unit. Advantageously, this arrangement removes the need for additional wires or cables extending between the first and second modular units which might be susceptible to failure by becoming loose or breaking and which provide an additional feature on which other components of the parachute and payload package could snag.

In some embodiments, the first and second units have opposed faces when the units are placed together and the first and second parts of the connector are at least one of (1) accessible from and (2) mounted on the respective opposed faces. Advantageously, positioning the connector between opposed faces of the modular units conceals and protects the connector. A seal may be provided around the interface between the opposed faces when placed together. The connector may comprise a push fit connector whereby push fitting the two parts together establishes an electrical connection therebetween. The connector may include male and female parts, for example, a pin and socket arrangement or other type of relatively rigid interconnection system known to those skilled in the art.

In some embodiments, the flight controller includes a pulley winding controller adapted to automatically control the winding of control lines onto the pulley when the control lines are first connected thereto. In some embodiments, the winding controller is adapted to wind a first control line about a pulley means a first predetermined number of turns in a first direction. The pulley winding controller may be operable thereafter to wind a second control line on said pulley means a second predetermined number of turns in a second direction opposite to the first direction. In some embodiments, the first predetermined number of turns may be greater than the second predetermined number of turns, for example, twice the number of turns. In this latter example, once the second winding session is complete, the pulley means will contain the same number of windings for both control lines. The control lines may be placed on the pulley means so that on rotation of the pulley means in one direction, one control line is reeled out and the other control line is reeled in.

In some embodiments, an interface is provided to enable a user to control the winding controller. The interface may include a counter that displays the number of turns of the pulley means and/or means for setting the number of turns for the pulley means in a first direction and/or a second direction, and/or means for activating rotation of said pulley means in said first direction and/or said second direction and/or means for stopping rotation of said pulley means in the first direction and/or the second direction.

According to another aspect of the present invention, there is provided an apparatus for supporting a payload from a parachute, the apparatus comprising a bearing member, a load-bearing member coupled to the bearing member for connecting a payload thereto wherein the bearing member is adapted to enable relative movement between said bearing member and (1) a support member for supporting said bearing member connected between first and second suspension lines of a parachute or (2) suspension line means connected between different portions of a parachute canopy.

In some embodiments, the load bearing member is adapted to enable a flight controller for controlling flight of a parachute to be coupled thereto.

In some embodiments, the apparatus further comprises a second bearing member adapted to enable relative movement between said second bearing member and (1) a second support member for supporting said second bearing member connected between third and fourth suspension lines of a parachute or (2) second suspension line means connected between different portions of a parachute canopy.

Embodiments of the apparatus may include any one or more further feature(s) described or claimed herein.

According to another aspect of the present invention, there is provided a flight controller for controlling flight of a parachute, the flight controller including pulley means for controlling the length of a control line extending from said flight controller, the flight controller including a housing, an access opening in the housing for enabling at least a portion of the pulley means to be removed from the housing therethrough, and closure means for closing said access opening.

Some embodiments further include manual quick release means for releasably locking said closure means to enable ready access to said pulley means.

According to another aspect of the present invention, there is provided a modular flight controller comprising a plurality of modular units including a first modular unit and a second modular unit and an interface for enabling electrical signals and/or electrical power to pass from at least one modular unit to the other modular unit, wherein the interface comprises a connector having first and second parts which mate together to form an electrical connection, wherein said first part is mounted on said first unit and said second part is mounted on said second unit so that when said first and second units are placed together, said first part mates with said second part to form an electrical connection therebetween.

In some embodiments, the first and second units have opposed faces when the units are placed together and the first part is accessible from one of the opposed faces and the second part is accessible from the other of the opposed faces.

Some embodiments further include sealing means for providing a seal around the interface and between the opposed faces when the opposed faces are placed together.

Further embodiments of this aspect of the invention may include any one or more features disclosed or claimed herein.

According to another aspect of the present invention, there is provided a flight controller having first and second modular units each comprising a housing for containing one or more components of the flight controller. Embodiments of this aspect of the invention may include any one or more features described or claimed herein.

According to another aspect of the present invention, there is provided a flight controller for controlling flight of a parachute, wherein the flight controller includes drive means for driving rotation of one or more pulleys for accommodating one or more control lines of the flight controller and a set of pulleys each adapted for coupling with the drive means wherein the hub of at least one pulley in the set has a different diameter from the hub of at least one other pulley in the set.

Further embodiments of this aspect of the invention may include any one or more further features disclosed or claimed herein.

According to another aspect of the present invention, there is provided a flight controller having a pulley winding controller for controlling the number of turns of the pulley when winding a first control line, said winding controller being adapted to automatically stop rotating said pulley when said pulley has rotated a predetermined number of turns.

In some embodiments, the winding controller is adapted to wind a second control line on said pulley a predetermined number of turns. In some embodiments, the winding controller is adapted to wind the first control line thereon in a first direction and thereafter to wind said second control line thereon in the opposite direction. The number of turns in the first direction may be greater than the number of turns in the second direction, for example twice the number of times.

Embodiments of this aspect of the present invention may include one or more further features disclosed or claimed herein.

According to another aspect of the invention, there is provided a parachute assembly comprising a parachute having a canopy and suspension line means connected to said canopy for suspending an object therefrom, a first suspension line means being connected between different portions of said canopy, a bearing member to be moveably supported on said first suspension line means to enable relative movement therebetween, and a coupling connected to said bearing member for supporting an object therefrom.

According to one aspect of the present invention, there is provided a flight controller for controlling a parachute, comprising: a first controller adapted to vary the length of a first control line that extends, in use, from said first controller; a second controller adapted to vary the length of a second control line that, in use, extends from said second controller; wherein said flight controller includes a first adaptation that enables the first controller to be used to control the length of a third control line that, in use, extends from said first controller; and said flight controller includes a second adaptation that enables the second controller to be used to control the length of a fourth control line that, in use, extends from said second controller, and coupling means for coupling said flight controller to said parachute independently of said first, second, third and fourth control lines.

This aspect of the invention provides a flight controller which is adapted for use in steering a round parachute. The suspension lines of a round parachute may be divided into groups each of which corresponds to a quadrant of the parachute canopy. By pulling the suspension lines of one quadrant downward relative to the suspension lines of an opposite quadrant, the shape of the canopy can be distorted so that the parachute slips one direction and thus, motion of the parachute can be controlled in all azimuthal directions. The flight controller includes a first controller that enables the length of a first control line to be varied. The first control line may be used to control one or more suspension lines in the first quadrant of the parachute. The flight controller further includes a second controller that enables the length of a second control line to be varied. The control line may be used to control one or more suspension lines in a second quadrant of the parachute. The flight controller also includes a first adaptation that enables the length of a third control line to be varied. The third control line may be used to control one or more suspension lines in a third quadrant of the parachute. The flight controller includes a second adaptation that enables the length of a fourth control line to be varied. The fourth control line may be used to control one or more suspension lines in a fourth quadrant of the parachute.

Thus, this aspect of the invention provides a flight controller with first and second adaptations that enable the flight controller to vary the length of four control lines, each of which may be used to control one or more suspension lines of a respective quadrant of a round parachute to enable azimuthal motion of the parachute to be controlled.

In this aspect of the invention, the flight controller further includes coupling means for coupling the flight controller to the parachute independently of the first, second, third and fourth control lines. The coupling means may be arranged so that the load of the flight controller is transmitted to the parachute primarily through the coupling means, thereby reducing the load on the control lines or completely removing the control lines from the load path between the parachute and the flight controller. Advantageously, this reduced or lack of loading on the control lines enables the size of the flight controller to be reduced, as the mechanism for securing and controlling the length of the control lines can be more compact and less robust than that of a mechanism that would be required if the loading of the flight controller were to be transmitted through the control lines.

In some embodiments, the first controller comprises a first pulley and drive means, for example an electric motor, for driving rotation of the first pulley. Similarly, the second controller may comprise a second pulley and drive means, such as an electric motor, for driving rotation of the second pulley.

In some embodiments, the first adaptation may comprise a third pulley and drive means, such as an electric motor, for driving rotation of the third pulley. Similarly, the second adaptation may comprise a fourth pulley and drive means, such as an electric motor, for driving rotation of the fourth pulley.

Although each of the first and third pulleys may be driven by separate drive means, e.g. separate electric motors, in other embodiments, the first and third pulleys may be driven by the same drive means, e.g. the same electric motor. Advantageously, this reduces the number of components required for the flight controller and enables the flight controller to be more compact.

Similarly, although the second and fourth pulleys may be driven by separate drive means, e.g. separate electric motors, in other embodiments, the second and fourth pulleys may both be driven by the same drive means, e.g. the same electric motor. Again, this reduces the component count with attendant benefits.

Generally, as used herein, the reference to "a first adaptation" means a feature that either fully enables the first controller to control the length of the third control line or a feature that enables the first controller to be readily adapted to control the length of the third control line. Generally, the reference to "a second adaptation", as used herein, means a feature that either fully enables the second controller to control the length of a fourth control line, or a feature that enables the second controller to be readily adapted to control the length of the fourth control line.

Non-limiting examples of a first adaptation include any one or more of a third pulley, a drive means that is adapted to drive rotation of the third pulley, a coupling that enables a third pulley to be coupled to the drive means that drives rotation of the first pulley, for example a driveshaft that enables the third pulley to be mounted thereon and/or a feature of the first pulley that enables the third pulley to be mounted or connected thereto.

Non-limiting examples of a second adaptation include any one or more of a fourth pulley, a drive means that is adapted to drive rotation of the fourth pulley, a coupling that enables a fourth pulley to be coupled to the drive means that drives rotation of the second pulley, for example, a driveshaft that enables the fourth pulley to be mounted thereon and/or a feature of the second pulley that enables the fourth pulley to be connected or mounted thereto.

In some embodiments, the flight controller may be permanently configured to enable the length of the third and fourth control lines to be varied. For example, the flight controller may be permanently equipped with a third and fourth pulley for this purpose. In other embodiments, the flight controller may be reconfigurable so that, in one configuration, it is only fully enabled to control the length of the first and second control lines but not the third or fourth control lines, and in a second configuration, the flight controller may be fully enabled to control the length of all four control lines. This may be achieved by allowing the third and fourth pulleys to be releasably coupled to the flight controller so that they can be incorporated into the flight controller when required, and removed therefrom when not required. On the other hand, the third and fourth pulleys may be incorporated into the flight controller when only the first and second control lines are required but the third and fourth control lines may be omitted.

In some embodiments, the first pulley comprises a hub and opposed first and second side flanges on either side of the hub, each having a radial dimension greater than that of the hub, and the second pulley comprises a second hub and a side flange on one side of the second hub which has a radial dimension greater than that of the second hub, and wherein the other side of the second hub is adapted to abut against one of the side flanges of the first pulley.

In some embodiments, at least one of the side flanges of the first pulley comprises a discrete member separable from the hub of the first pulley.

In some embodiments, one or both of the first and second hubs each has a slot formed therein for accommodating the end of a control line. A pin or connector may be positioned in the slot of one or both of the first and second hubs for securing a control line to a respective pulley.

In some embodiments, the flight controller comprises a first guide for guiding the first control line towards the parachute and having an upwardly or sideways facing aperture for receiving the first control line; a second guide for guiding the second control line towards the parachute and having a second upwardly or sideways facing aperture for receiving the second control line; and wherein the first adaptation comprises a third guide for guiding the third control line towards the parachute and having a third upwardly or sideways directed aperture for receiving the third control line.

In some embodiments, the second adaptation comprises a fourth guide for guiding the fourth control line towards the parachute and having a fourth upwardly or sideways directed aperture for receiving the fourth control line.

In some embodiments, the flight controller further comprises support means for supporting the first and second controllers, and wherein the coupling means comprises a member separable from the support means, the flight controller further comprising connecting means for releasably connecting the coupling member to the support means.

In some embodiments, the connecting means comprises a load bearing member fixed to one of the support means and the coupling member for engaging the other of the support means and the coupling member, and locking means for locking the load bearing member to the other of the support means and the coupling member.

In some embodiments, the locking means comprises a latch. The latch may comprise a manually operable lever, movable between a first position which locks the load bearing member to the other of the support means and the coupling member, and a second position which enables the load bearing member to be released from the other of the support means and the coupling member.

In some embodiments, the coupling member includes a coupling for coupling a payload thereto. In some embodiments, the coupling member may comprise a plate.

In some embodiments, the support means comprises a housing for accommodating the first and second controllers.

In some embodiments, the flight controller may further comprise one or more other components, and second support means for supporting the one or more other components, wherein the second support means is separate, i.e. discrete from the first support means. The one or other components may comprise one or more of a source of electrical power, such as a battery, and processor means for controlling the first and second controllers.

In some embodiments, the flight controller may further comprise coupling means for releasably coupling the second support means to the first support means. The coupling means may for example comprise the coupling member.

In some embodiments, the coupling means comprises a pulley for riding on a coupling line having first and second ends, each end of the coupling line being connected to one or more suspension lines of the parachute, when in use, wherein the first control line is adapted for connection to the coupling line on one side of the pulley and the third control line is adapted for connection to the coupling line on the other side of the pulley, and the flight controller further comprises means for limiting movement of the pulley relative to the coupling line. In some embodiments, the flight controller may further comprise a controller for deactivating the limiting means. In some embodiments, the limiting means comprises means for coupling the coupling line on one side of the pulley to the coupling line on the other side of the pulley. In some embodiments, the controller for deactivating the limiting means comprises at least one of the first and third control lines.

In some embodiments, the flight controller further comprises release means coupled to at least one of the first and third control lines for disconnecting the limiting means.

According to another aspect of the present invention, there is provided a flight controller for controlling a parachute, the flight controller comprising a controller for controlling the length of at least three control lines extending therefrom, in use.

Some embodiments may comprise means for releasably connecting at least one of the control lines to the controller.

In some embodiments, the controller comprises a pulley, and the means for releasably connecting comprises one or both of (1) means for releasably connecting the control line to the pulley and (2) means for releasably connecting the pulley to the controller.

In some embodiments, the controller is adapted for controlling at least four control lines extending therefrom.

In some embodiments, the controller is adapted such that when the length of a first control line is shortened, the length of a third control line is lengthened, and vice versa. The controller may further be adapted such that when the length of a second control line is shortened, the length of a fourth control line is lengthened, and vice versa. The controller may be adapted such that the rate of change of length of the first control line substantially corresponds to the rate of change of the length of the third control line. The controller may further be adapted such that the rate of change of the length of the second control line substantially corresponds to the rate of change of the length of the fourth control line.

According to another aspect of the present invention, there is provided an apparatus for a coupling line and a pulley of a parachute, the coupling line interconnecting suspension lines of the parachute, the apparatus comprising limiting means for limiting displacement of a portion of the coupling line on one side of the pulley relative to a portion of the coupling line on the other side of the pulley.

In some embodiments, the limiting means comprises connection means for releasable coupling the portions together.

According to another aspect of the present invention, there is provided a flight controller for controlling a parachute in which the flight controller is adapted for use with both a ram-air parachute and a round parachute.

Examples of embodiments of the present invention will now be described with reference to the drawings, in which:

BRIEF DESCRIPTION OF THE DRAWINGS

FIG. 22A shows a modular flight controller according to one embodiment of the present invention;

FIG. 22B shows a modular flight controller according to another embodiment of the present invention;

DESCRIPTION OF EMBODIMENTS

Figure 1:
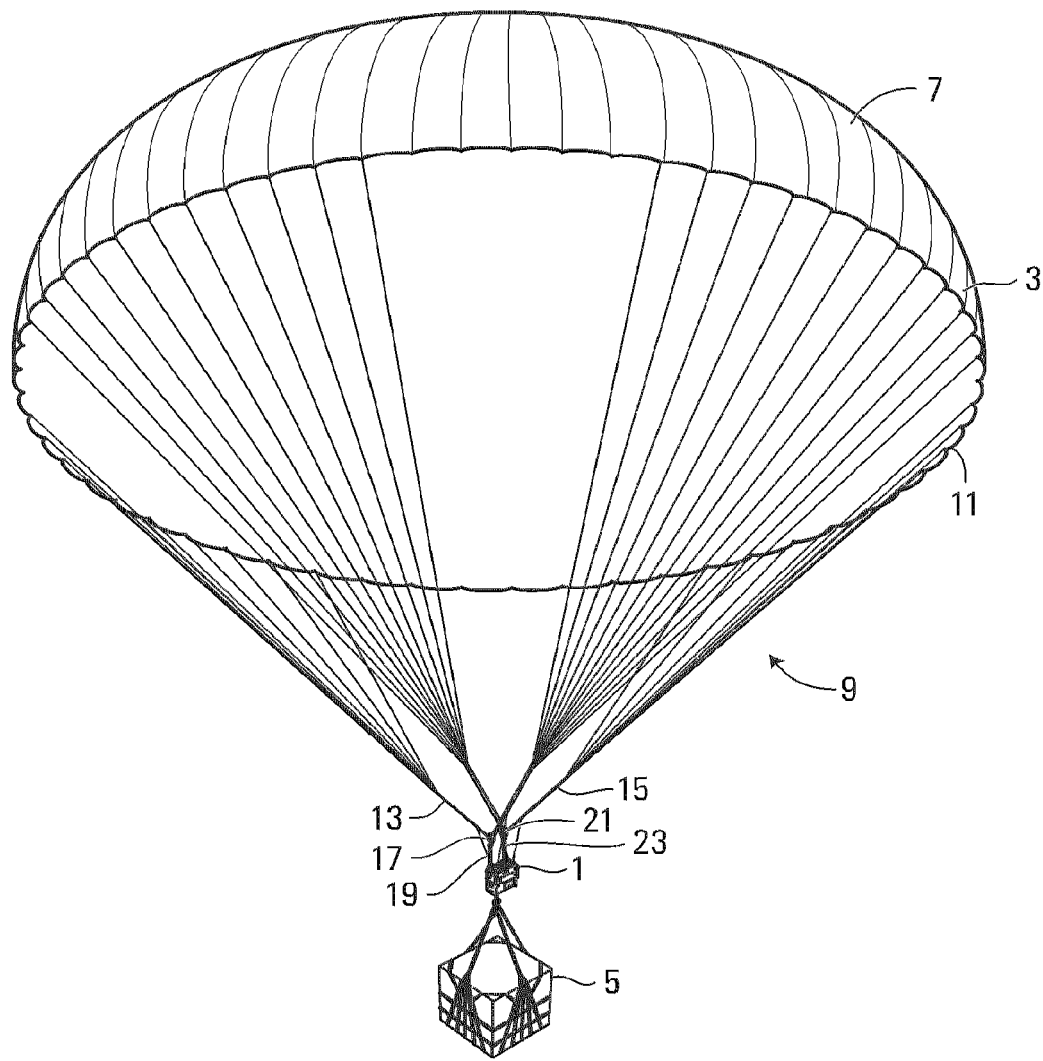
FIG. 1 shows a perspective view of a flight controller according to an embodiment of the present invention suspended beneath a round parachute carrying a payload.

FIG. 1 shows a flight control unit 1 according to an embodiment of the present invention suspended beneath a round parachute 3 carrying a payload 5. The parachute 3 has a canopy 7 and suspension lines 9 extending downwardly from the peripheral edge 11 of the canopy. The suspension lines are divided into four groups, with the suspension lines of each group being associated with a particular quadrant of the canopy 7. A first support member, for example, a first coupling line or sling 13 is connected between the suspension lines of a first quadrant and the suspension lines of a third, opposite quadrant. A second support member, for example, a second coupling line or sling 15 is connected between the suspension lines of a second quadrant and the suspension lines of an opposite, fourth quadrant. A first bearing member, for example a first pulley 17 which is connected to a first riser 19 is positioned on the first coupling line or sling 13, and a second bearing member, for example, a second pulley 21 connected to a second riser 23 is positioned on the second coupling line or sling 15. The flight controller 1 is suspended from below the pulleys by the first and second risers. The payload 5 is suspended below the flight controller 1 and is also coupled to the first and second risers. The risers form part of a load-bearing coupling for supporting a flight controller and payload.

Figure 2A:
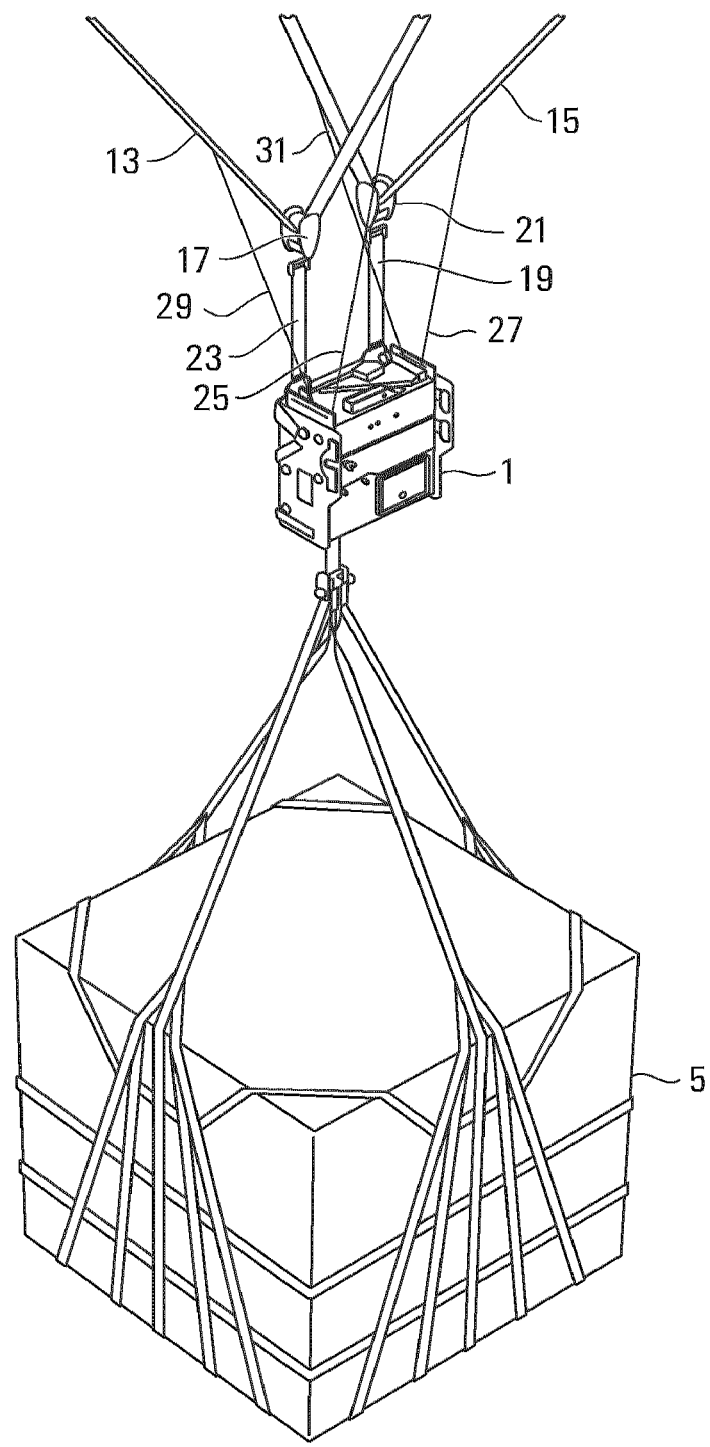
FIG. 2A shows an expanded perspective view of the flight controller and payload shown in FIG. 1.

FIG. 2A shows the flight controller 1, payload 5, coupling lines 13, 15, pulleys 17, 21 and risers 19, 23 in more detail. As shown in FIG. 2A, the payload is suspended by a single web which may allow the payload 5 to rotate relative to the control unit relatively easily, thereby reducing the coupling between the payload and the control unit that would otherwise transmit torque from the payload to the control unit. In some embodiments, a rotary coupling may be provided between the payload and the control unit to allow the payload to rotate freely.

Figure 2B:
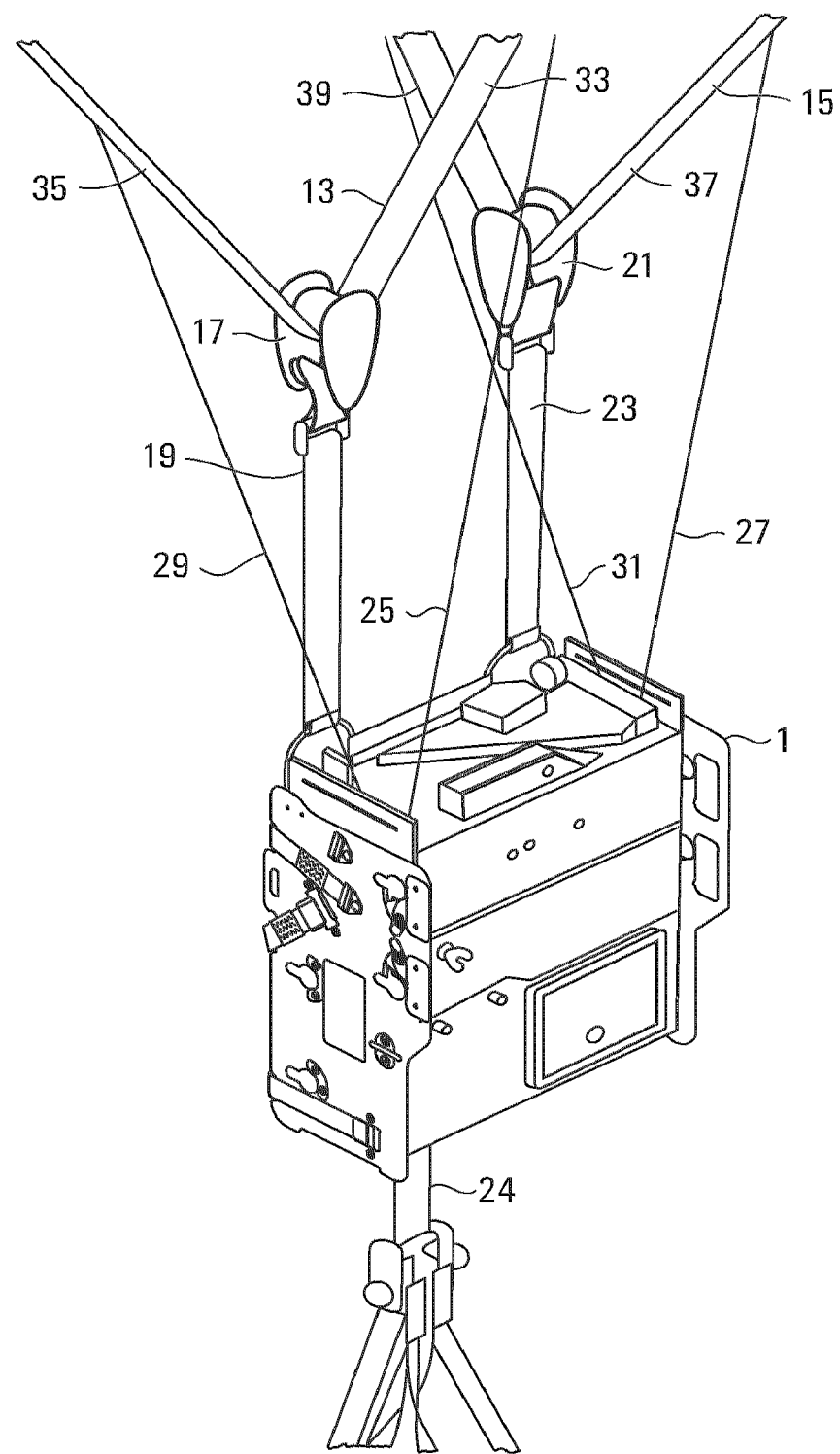
FIG. 2B shows a more detailed perspective view of the flight controller of FIGS. 1 and 2A.

FIG. 2B shows the flight controller in more detail. The flight controller 1 includes first, second, third and fourth control lines 25, 27, 29, 31 extending upwardly from the flight controller. The first control line 25 is connected to a portion 33 of the first coupling line 13 that extends from one side of the first pulley 17, and the third control line 29 is connected to a second portion 35 of the coupling line 13 extending from the other side of the first pulley 17. The second control line 27 is connected to a first portion 37 of the second coupling line 15 that extends from one side of the second pulley 21 and the fourth control line 31 is connected to a second portion 39 of the second coupling line 15 that extends from the other side of the second pulley 21. The control lines may be connected to the coupling lines at any suitable position therealong, for example at the ends thereof or at any intermediate position between the ends and a respective pulley. For example, it might be convenient to connect the control lines to each end of the coupling line where the coupling lines are connected to the suspension lines of the parachute. The control lines may be connected to the coupling lines using the connectors that connect the coupling lines to the suspension lines. In other embodiments, one or more control lines may be directly connected to a respective group of suspension lines.

As shown in FIG. 2B, the first and second pulleys 17, 21 are generally oriented at 90° to one another with the first coupling lines connected to suspension lines of a first pair of opposite quadrants and the second control line being connected to suspension lines of a second pair of opposite quadrants.

In operation, the flight controller is adapted to control the length of the control lines extending therefrom to pull the coupling lines through the respective pulleys in one direction or another thereby causing vertical displacement of the suspension lines of one quadrant relative to the vertical displacement of the suspension lines of the opposite quadrant, and thereby causing the parachute to slip in a particular direction.

Figure 2C:
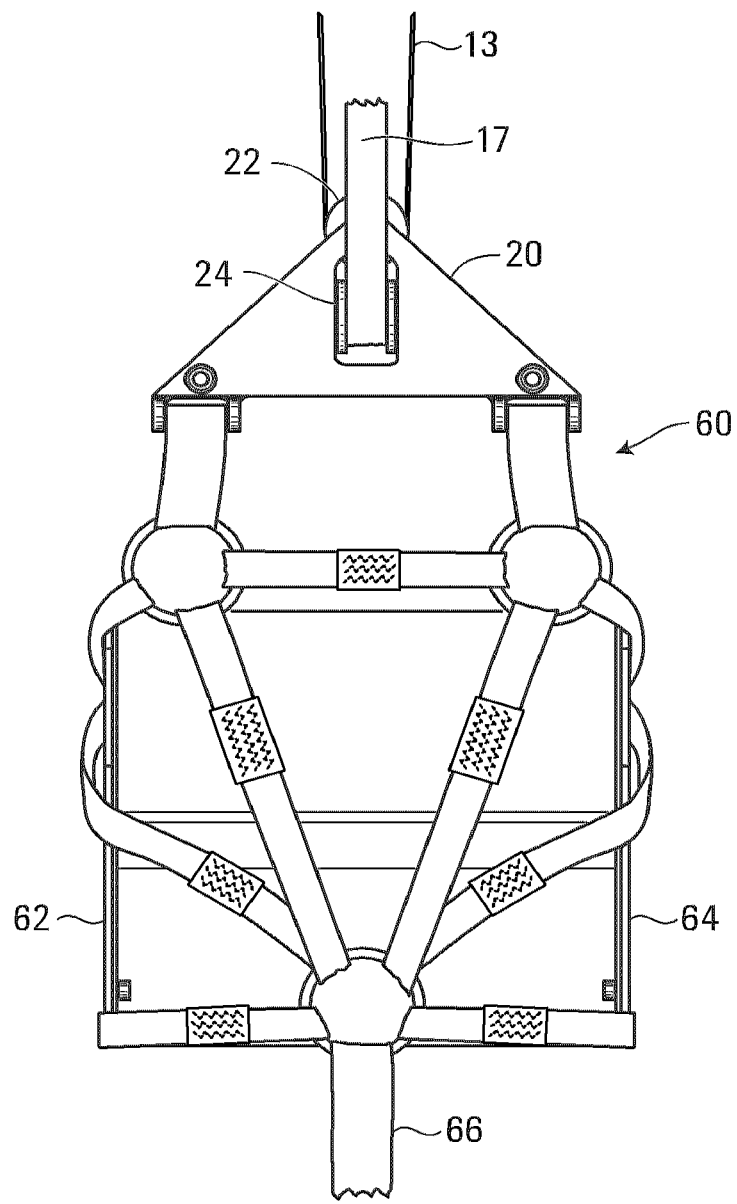
FIG. 2C shows a front view of a pulley mounting system according to an embodiment of the present invention.
Figure 2D:
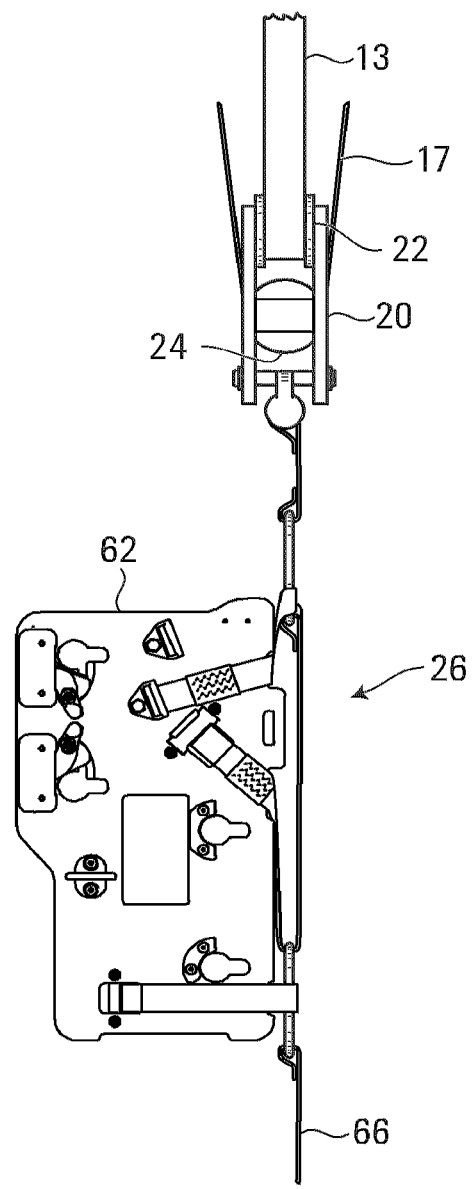
FIG. 2D shows a side view of the pulley mounting system shown in FIG. 2C.

FIGS. 2C and 2D show an alternative embodiment of an external pulley assembly according to an embodiment of the present invention. The pulley assembly includes a support structure 20 for supporting first and second pulleys 22, 24 at a fixed angle relative to one another, in this example at 90 degrees. In this embodiment, the support structure 20 includes a generally triangular frame. The first pulley 22 is mounted in a position near the apex of the triangular frame 20 and the second pulley 24 is mounted below the first pulley within the triangular frame. A load-bearing coupling 60 (in the form of a harness) is suspended below the frame for supporting a flight controller and payload. The harness 60 includes a connector 62, 64, for connecting the coupling to a flight controller and a load-bearing connector 66 for connecting a payload thereto. The coupling is described in more detail below with reference to FIGS. 7A to 7C.

Figure 3A:
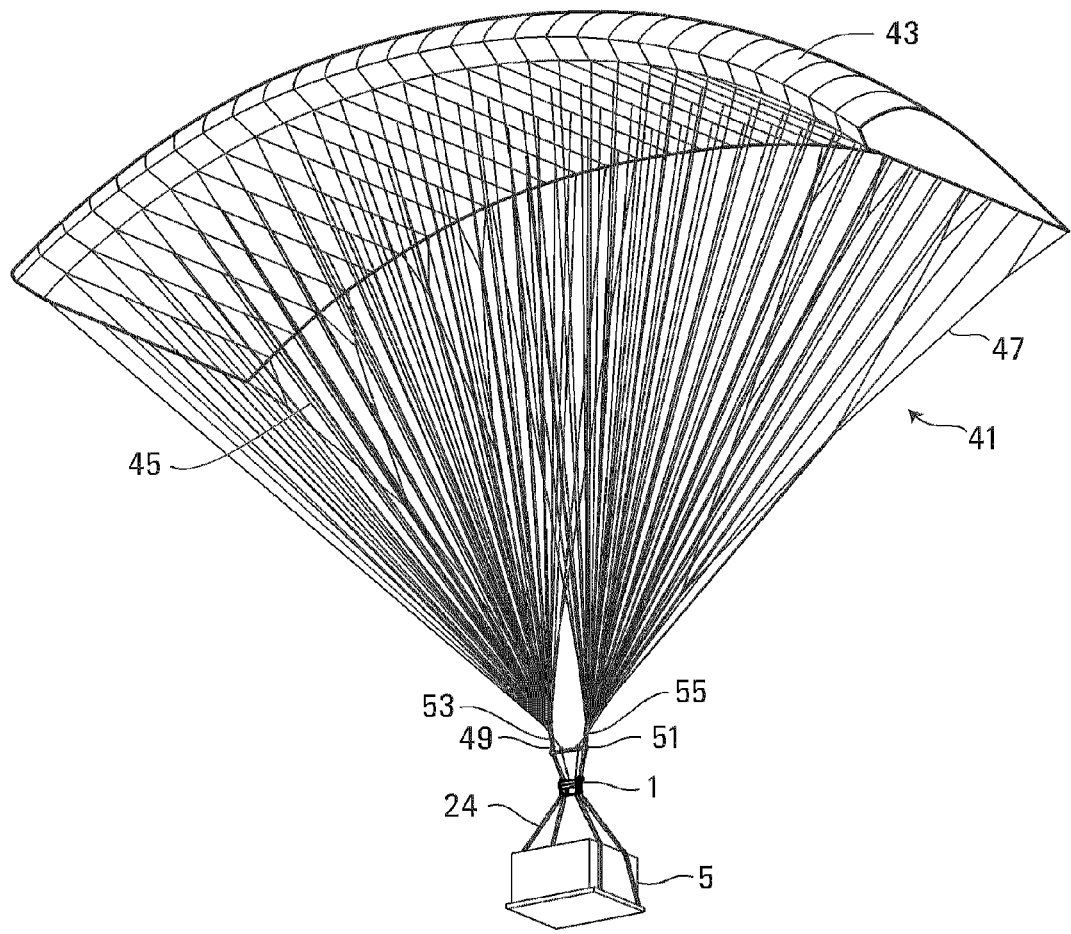
FIG. 3A shows a perspective view of an embodiment of the flight controller suspended beneath a square parachute.

FIG. 3A shows an example of an aerial delivery system in which the flight controller is used to control a ram-air parachute. The ram-air parachute 41 has a generally rectangular canopy 43 and a group of suspension lines 45, 47 extending downwardly from a respective side of the canopy. The lower ends of each group of suspension lines is connected to a respective riser 49, 51. The flight controller 1 is suspended from the risers. A payload 5 is suspended below the flight controller by a suitable riser 24. The riser 24 may be coupled to the upper risers 49, 51 by a suitable intermediate coupling, embodiments of which are described below.

Figure 3B:
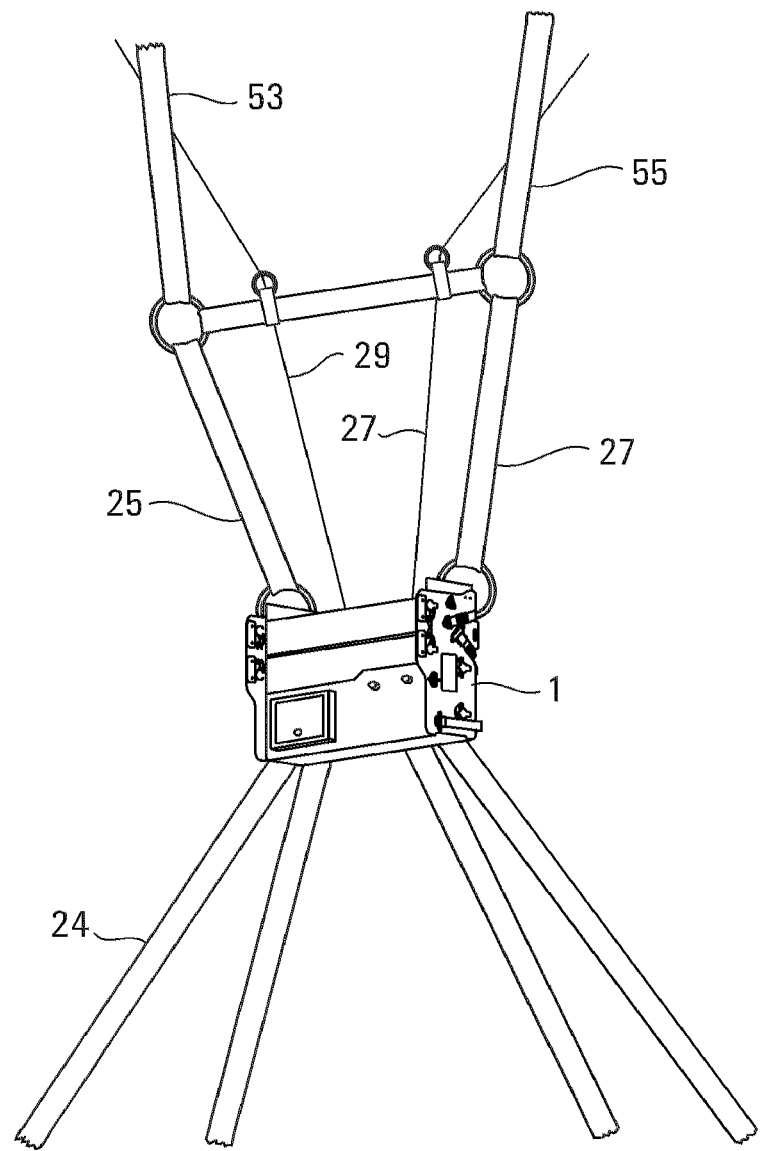
FIG. 3B shows a more detailed view of the flight controller of FIG. 3A.

Referring to FIG. 3B, which shows the flight controller in more detail, the flight controller includes first and second control lines 25, 27, the first control line being connected to one or more steering lines 53 on one side of the parachute, and the second control line 27 being connected to one or more steering lines 55 on the other side of the parachute. The flight controller includes a mechanism for varying the length of each control line that extends from the flight control unit, thereby controlling the steering lines 53, 55. Thus, retracting a control line 25 will pull a steering line downwardly and extending the length of the control line will allow the steering line to move upwards.

Figure 3C:
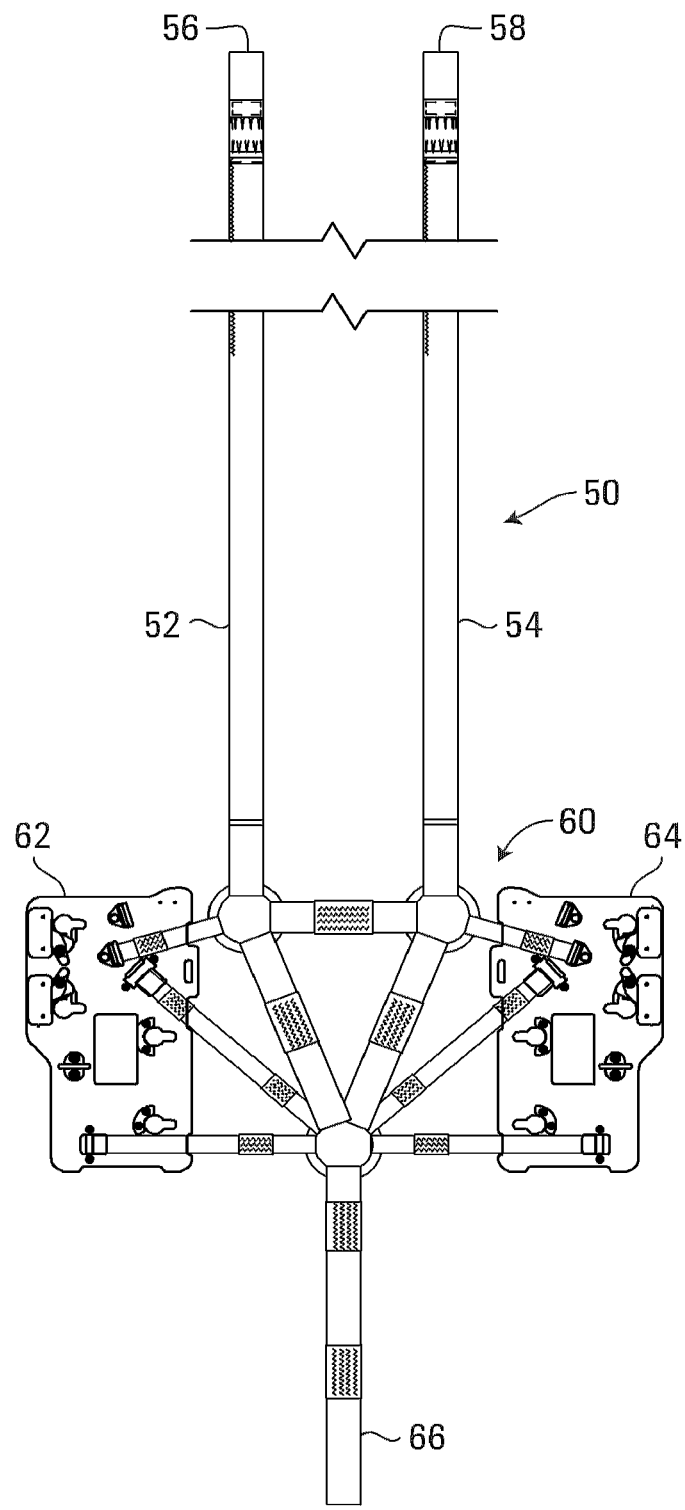
FIG. 3C shows a detailed view of a harness arrangement for a square parachute according to an embodiment of the present invention.

FIG. 3C shows an embodiment of load-bearing coupling for a ram-air parachute in more detail. The coupling 50 includes first and second risers 52, 54 having upper ends 56, 58 that, in use, attach to two groups of suspension lines of a parachute. The coupling further includes a harness 60, which includes a connector 62, 64, for connecting the coupling to a flight controller and a load-bearing connector 66 for connecting a payload thereto. The harness 60 is similar to that described above in connection with FIG. 2C. In some embodiments, the same harness may be used for both round and square parachutes by connecting it either to the pulley system (FIG. 2C, 2D) or to the risers (FIG. 3C) at any suitable connection point and using any suitable connector(s).

The main difference between the flight controller used for a ram-air parachute and that used for a round parachute is that in the case of a ram-air parachute, two control lines are used, whereas for a round parachute, four control lines are used. In some embodiments, the same flight controller can be adapted for use in both applications, and embodiments of a configurable flight controller are described below.

Figure 4:
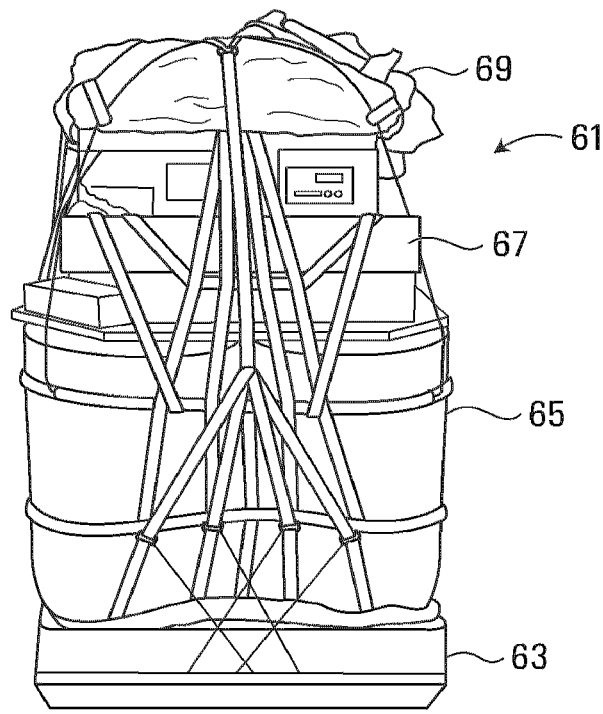
FIG. 4 shows a perspective view from the front or side of a round parachute, a flight controller and a payload in a stored configuration.

In a number of aerial delivery applications, the cargo container/bag assemblies are of a standard size and the plan form dimensions of the container assembly are fixed. For example, the A-22 cargo bag assembly is a USAF/USA and NATO standard and by default a world-wide standardized cargo container. Rigging of the container for use on cargo aircraft is well documented, including the maximum allowable height for particular aircraft. Typical in-service cargo loads are lighter than the maximum weight capacity of the bag/container. Typical tactical cargo aircraft such as the C-130 Hercules has a finite volume in its cargo bay which in turn defines the maximum number of A-22 cargo containers that can be accommodated. Given that the A-22 plan form dimensions are fixed, the height is the only variable that can be increased to maximize cargo capacity per A-22 bag/container. Maximizing cargo height therefore minimizes wasted valuable space on the cargo aircraft thereby improving utilization efficiency and reducing cost per pound carried. FIG. 4 shows an example of a configuration for a rigged cargo container that has been used in the past. Referring to FIG. 4, the rigged cargo container 61 includes a platform 63 of fixed dimensions which supports a cargo container 65. Above the cargo container is a flight control unit 67, and positioned above the flight control unit is a parachute 69. As can be seen, the lateral dimensions of the flight controller are similar to the lateral dimensions of the platform 63 and the cargo container 65.

Figure 5:
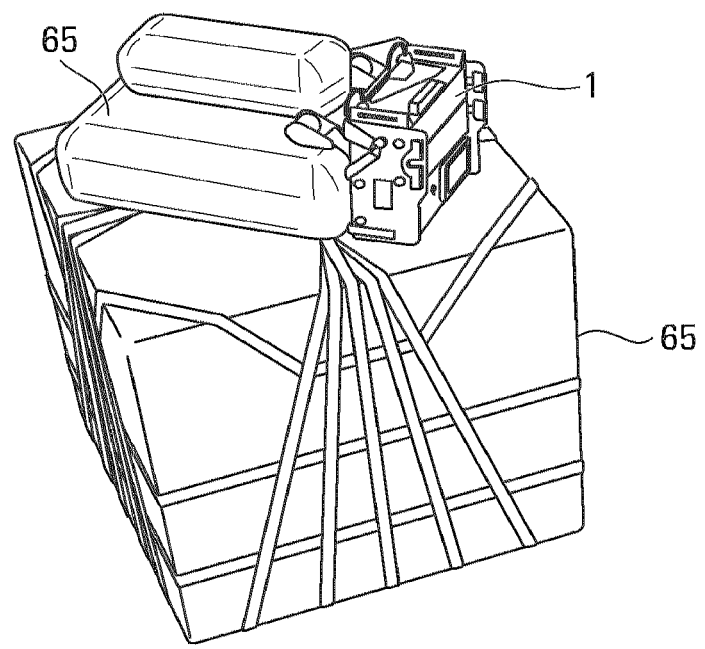
FIG. 5 shows a perspective view of a parachute, flight controller and payload in a stored configuration according to an embodiment of the present invention.

FIG. 5 shows an example of a configuration for a rigged cargo container using a flight controller according to an embodiment of the invention. The rigged system includes a cargo container 65, which may be supported on a platform (not shown), a flight controller 1 positioned on the cargo container 65 and a parachute 69 also positioned on the cargo container and to one side of the flight control unit. The flight control unit 1 is considerably smaller than the flight control unit 67 of FIG. 4. This is made possible by virtue of the flight controller 1 having a coupling that enables the weight of the flight controller to be transferred to the parachute through the coupling rather than through the control lines. In addition, the arrangement enables the weight of the cargo to be transferred directly to the parachute, rather than through the flight controller and control lines. Reducing the size of the flight controller so that the control unit can be mounted side by side with the parachute above the cargo container allows the overall height of the parachute and flight control unit to be considerably reduced. In turn, this allows the cargo container to be filled to a greater height before the maximum height limitation of the overall package is reached. Thus, the arrangement enables a greater mass and volume of payload to be delivered per container, thereby increasing the efficiency of the delivery system. Conversely, if the mass and volume of the cargo remains unchanged, the overall mass and volume of the total rigged package are reduced relative to the previous configuration as a result of the flight control unit being considerably lighter and more compact, which translates to a reduced cargo payload for the aircraft and a saving in fuel.

Figure 6A:
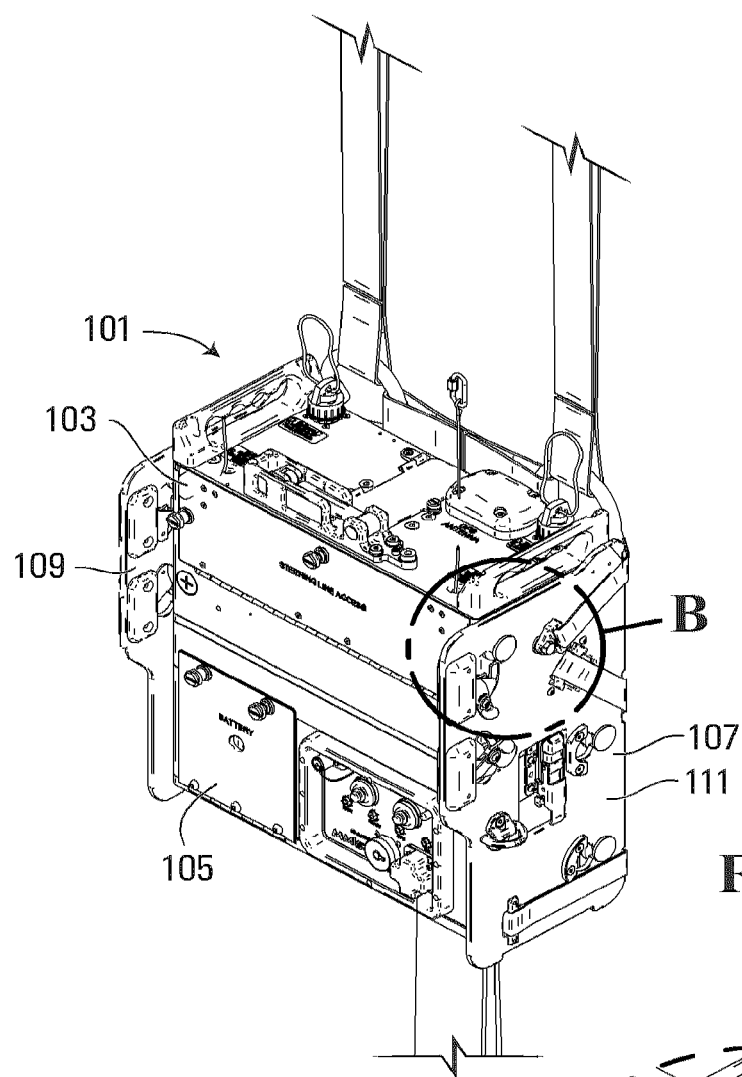
FIG. 6A shows a perspective view of a flight controller according to an embodiment of the present invention.

FIG. 6A shows a perspective view of a flight controller assembly and mounting system. The flight controller assembly 101 comprises a plurality of modular units. In the present embodiment, the assembly comprises a first, upper modular unit 103 and a second, lower modular unit 105. The upper unit houses or supports various mechanical and electromechanical components of the flight controller, and the lower unit houses or supports various electrical and electronic components of the flight controller. The upper and lower modules are designed to be detachable from one another. This allows one of the modules to be replaced with another to facilitate servicing and obviates the need for replacing the entire system if a fault or failure in one of the modules occurs. In addition, the separability of the modules allows each module to be carried separately making the system more portable.

Figure 6B:
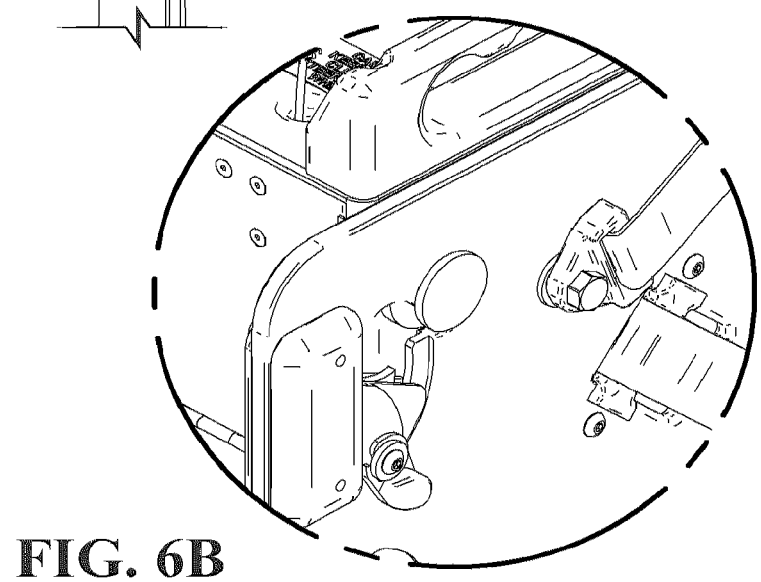
FIG. 6B shows a detailed view of a release mechanism for releasably attaching a side support plate to the flight control unit of FIG. 6A.

The mounting system 107 comprises first and second side plates 109, 111 which releasably attach to each side of the flight controller 101. In some embodiments, the attachment mechanism is a quick release mechanism, requiring no additional tools, and an example is shown in FIG. 6B and will be described in more detail below with reference to FIGS. 20A to 20D.

Figure 7A:
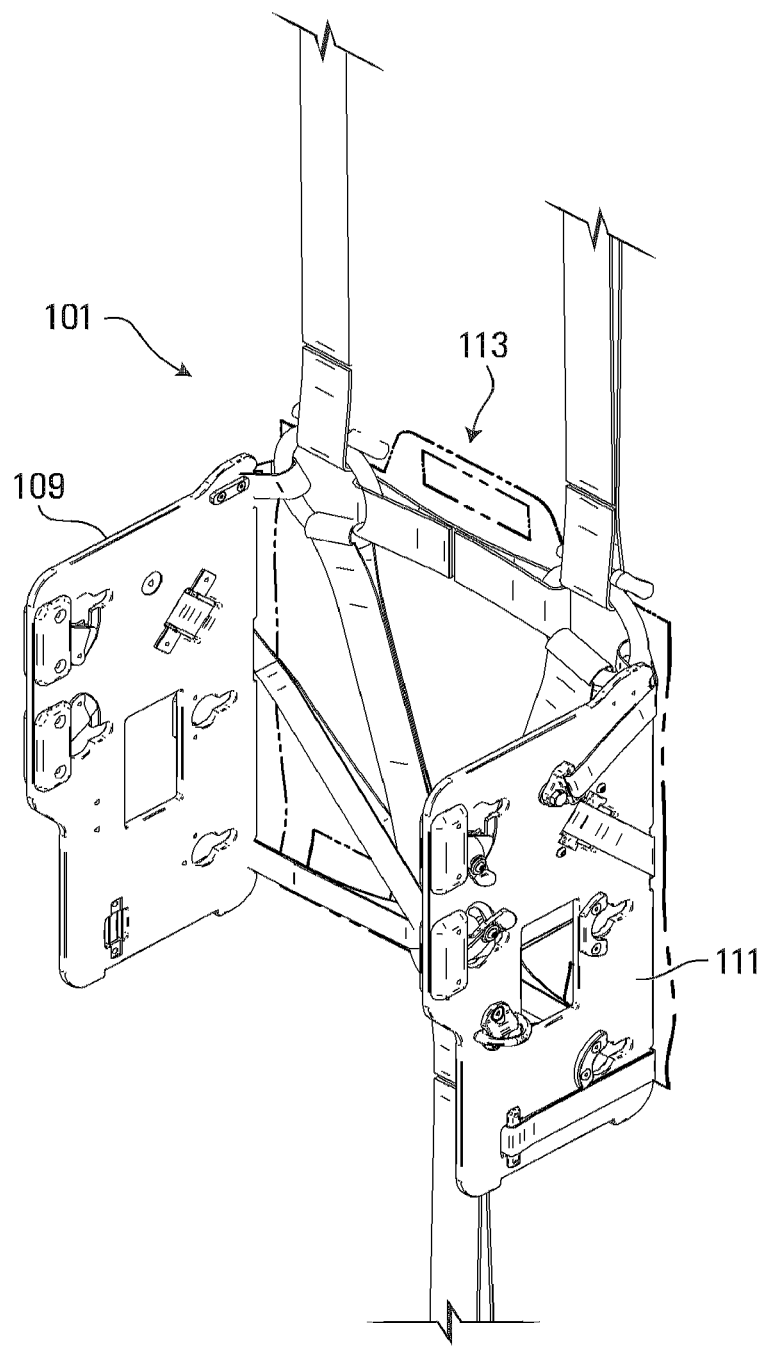
FIG. 7A shows a perspective view of a pair of side support plates and a payload-to-parachute connection system according to an embodiment of the present invention.
Figure 7B:
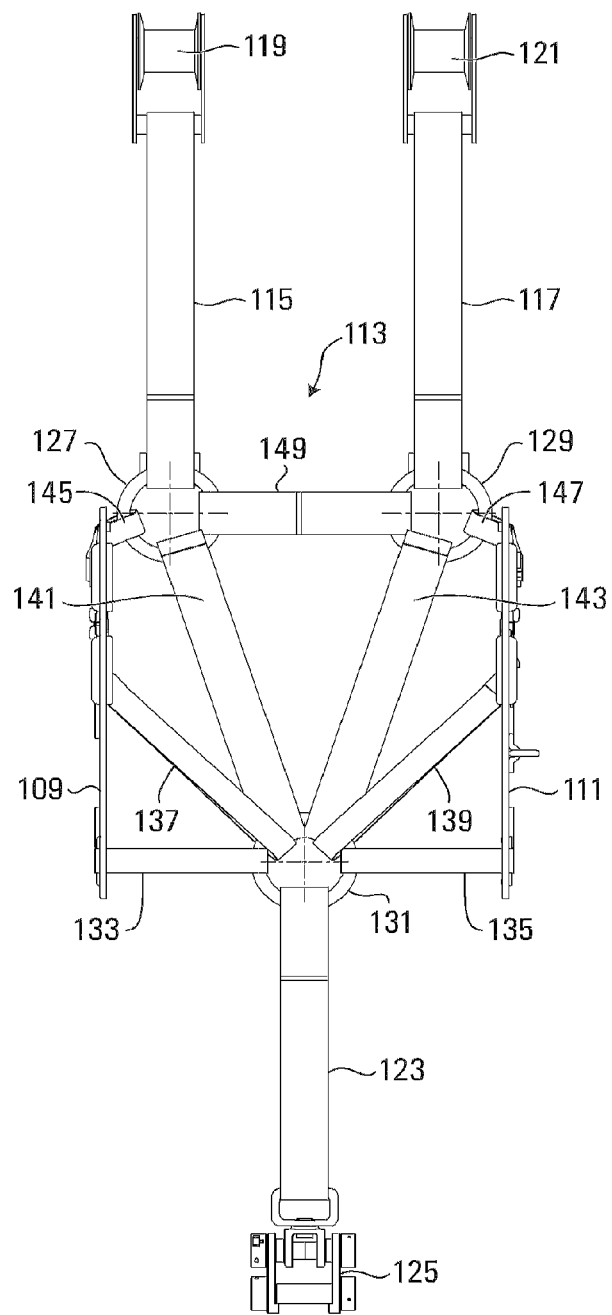
FIG. 7B shows a front view of the arrangement shown in FIG. 7A.
Figure 7C:
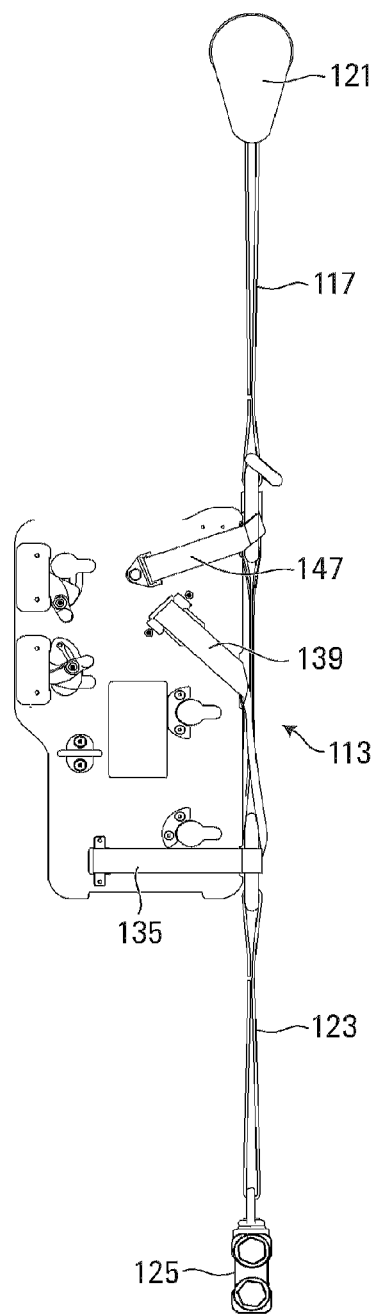
FIG. 7C shows a side view of the arrangement shown in FIG. 7A.

The mounting assembly is shown in more detail in FIGS. 7A to 7C. In addition to the side plates 109, 111, the mounting assembly includes a harness arrangement 113. The harness arrangement couples the side plates 109, 111 to first and second risers 115, 117, which, in use, couple to the coupling lines connected to the suspension lines of a parachute through first and second pulleys 119, 121, as described for example with reference to FIGS. 1, 2A and 2B above. The harness arrangement also includes a lower riser 123 and a coupling 125 for supporting a payload.

In this particular example, the harness 113 includes first and second upper rings 127, 129 and a lower ring 131. The harness arrangement further includes a pair of lateral webbings 133, 135 extending between the lower ring 131 and a lower portion of a respective side plate 109, 111, a second pair of webbings 137, 139 extending between the lower ring 131 and a middle portion of each side plate 109, 111, and a third pair of webbings 141, 143 extending from the lower ring 131 and the first and second rings 127, 129, respectively. Webbings or straps 145, 147 are also provided to couple the respective first and second rings 127, 129 to upper portions of the first and second side plates, respectively. The harness also includes a lateral upper webbing 149 which extends between the first and second rings. The webbings 133, 135, 137, 139, 145, 147 may be connected to the respective side plate using any suitable means including, for example, screws or bolts.

As can be appreciated, the harness provides a means of transferring the weight of the payload to the parachute without transferring the payload weight through the control unit. In addition, the harness and support plate combination transfer the weight of the control unit to the parachute in a manner which bypasses the control lines.

The mounting plates may provide a mechanism for enabling the flight controller to be quickly mounted thereto and released therefrom. This facilitates independent servicing of both the harness as part of the parachute system and the flight controller, which may typically be carried out by different specialists or specialist groups.

An example of a flight control module for controlling retraction and extension of the control lines for controlling a parachute is described in detail below with reference to FIGS. 8 to 19D.

Figure 8:
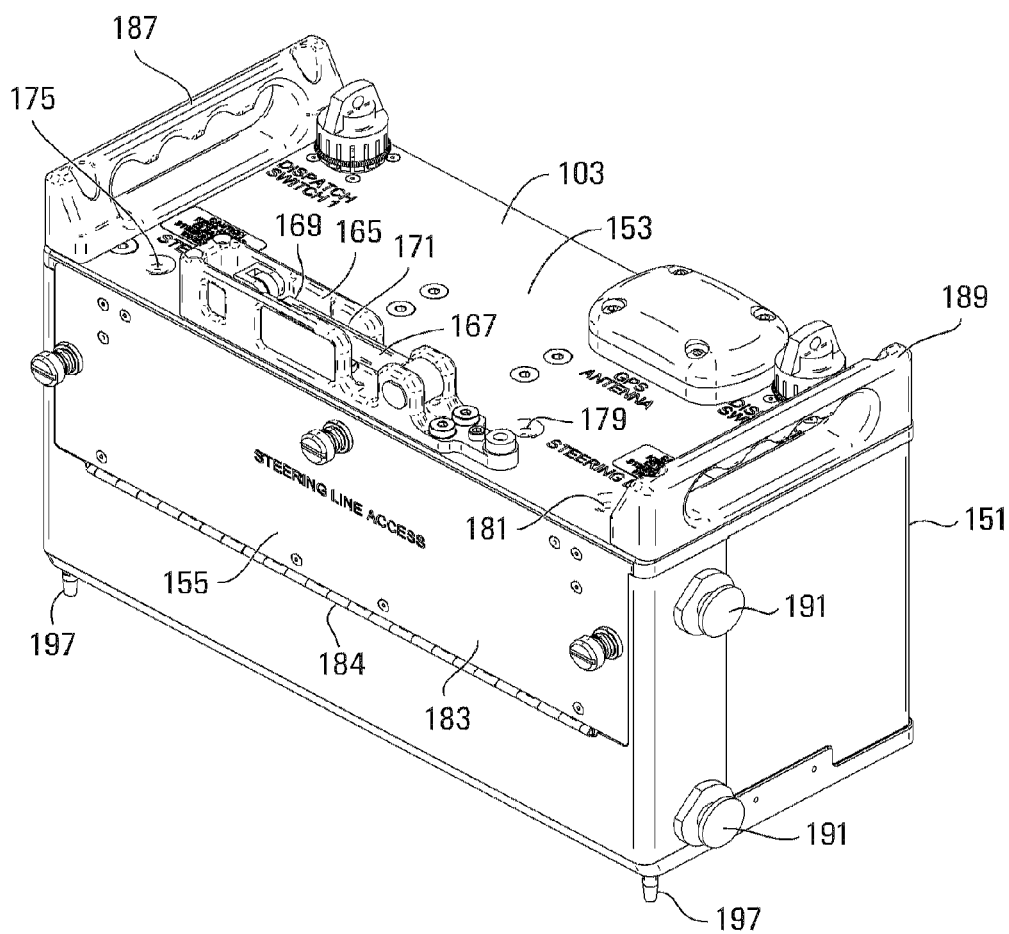
FIG. 8 shows a perspective view of an upper unit of the flight controller according to an embodiment of the present invention.

FIG. 8 shows a perspective view of the upper unit of the flight controller. The upper unit 103 comprises a housing 151 having a top 153, front 155, bottom 157, back 159 and opposed sides 161, 163, as shown in FIGS. 9A to 9F, respectively. The unit includes a connection mechanism for connecting a drogue or pilot parachute to the unit and which is controlled to release the drogue or pilot parachute at some point in time during deployment of the aerial delivery device. In this embodiment, the mechanism includes a rotatably mounted arm 167 to which the drogue parachute may be attached and a locking mechanism 169 which locks the free end of the arm in a receptacle 171 until the drogue parachute is to be released, whereupon the free end of the arm is unlocked and is free to rotate upwardly and away from the receptacle, thereby releasing the drogue parachute. The pilot or drogue parachute is used to deploy the main parachute at a particular phase of the deployment, and its release may be controlled for example by a timing mechanism and/or by any suitable parameter, such as altitude.

Figure 9A:
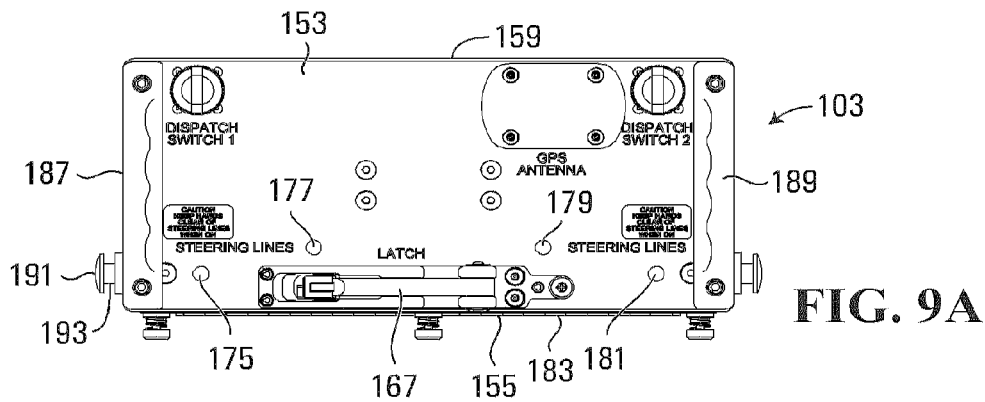
FIG. 9A shows a top view of the upper unit of the flight controller shown in FIG. 8.
Figure 9B:
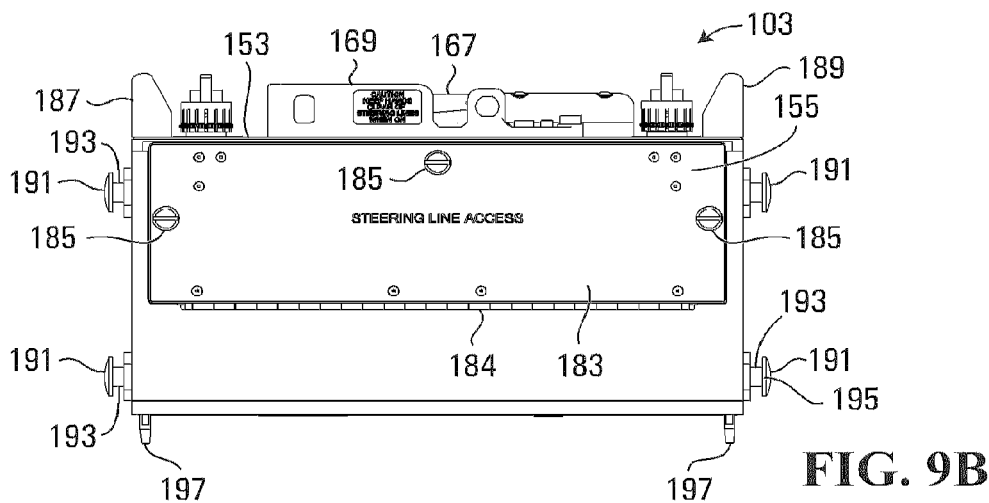
FIG. 9B shows a front view of the upper unit shown in FIG. 8.

Referring to FIG. 9A, the top of the unit includes first, second, third and fourth apertures 175, 177, 179, 181 for receiving respective control lines (not shown), and which face upwardly and guide the control lines towards the parachute.

The unit includes an access panel 183 that enables access to the control line pulleys within the unit. The access panel 183 may be conveniently hingedly connected to the main housing, for example by a hinge 184 and locked in place by one or more locking members 185. In other embodiments, the access panel may be completely removable.

The unit may include one or more optional carrying handles 187, 189. One or more connectors 191 may be provided to connect the unit to the mounting support plates, for example described above in connection with FIGS. 7A to 7C. In this embodiment, the connectors 191 are essentially load bearing connectors and include a shank portion 193 and an enlarged head 195.

Referring to FIGS. 8 and 9B to 9F, the unit may include one or more locators which engage with the lower unit to assist in placing the two units together during assembly and also to prevent or resist relative lateral movement between the two. In this embodiment, the locators 197 each comprise a protrusion extending from the bottom of the upper unit. In other embodiments, the locators may comprise one or more holes or recesses in the bottom of the upper unit for receiving a respective protrusion from the lower unit.

Figure 9C:
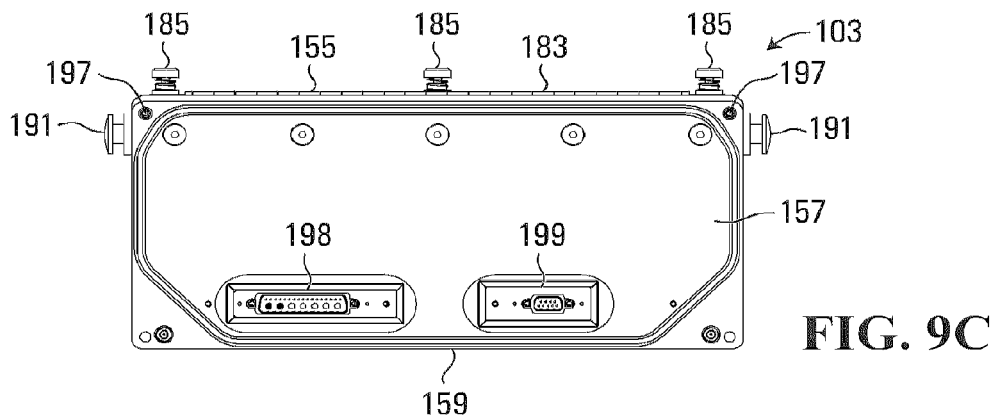
FIG. 9C shows a bottom view of the upper unit shown in FIG. 8.
Figure 9D:
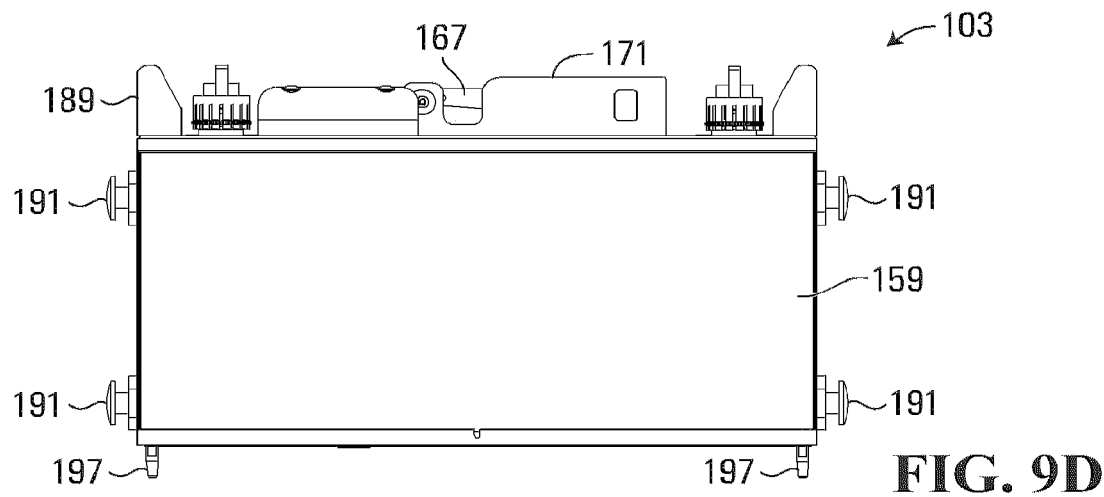
FIG. 9D shows a back view of the upper unit shown in FIG. 8.
Figure 9E:
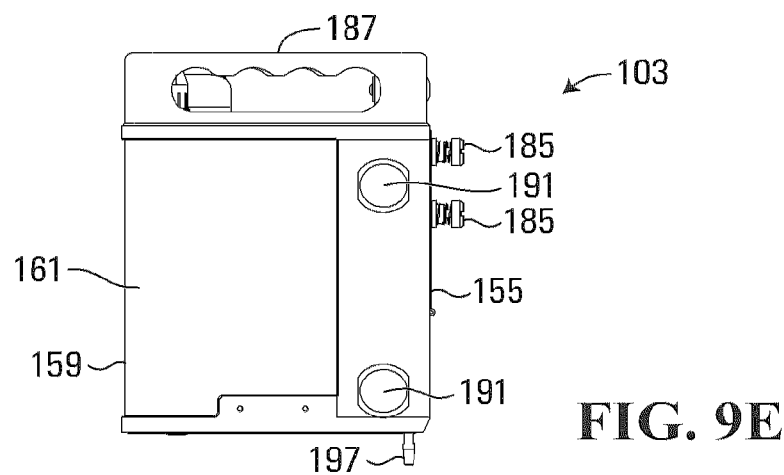
FIG. 9E shows a right-side view of the upper unit shown in FIG. 8.
Figure 9F:
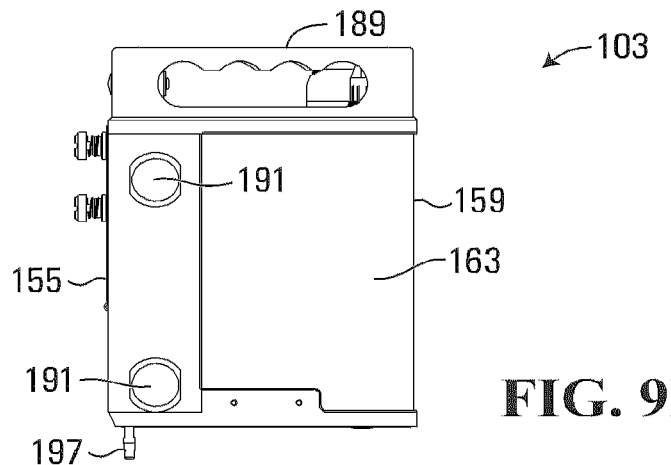
FIG. 9F shows a left-side view of the upper unit shown in FIG. 8.

Referring to FIG. 9C, one or more interfaces 198, 199 are provided on the bottom of the unit to enable electrical power and/or electrical signals to be exchanged between the upper and lower units.

Figure 10:
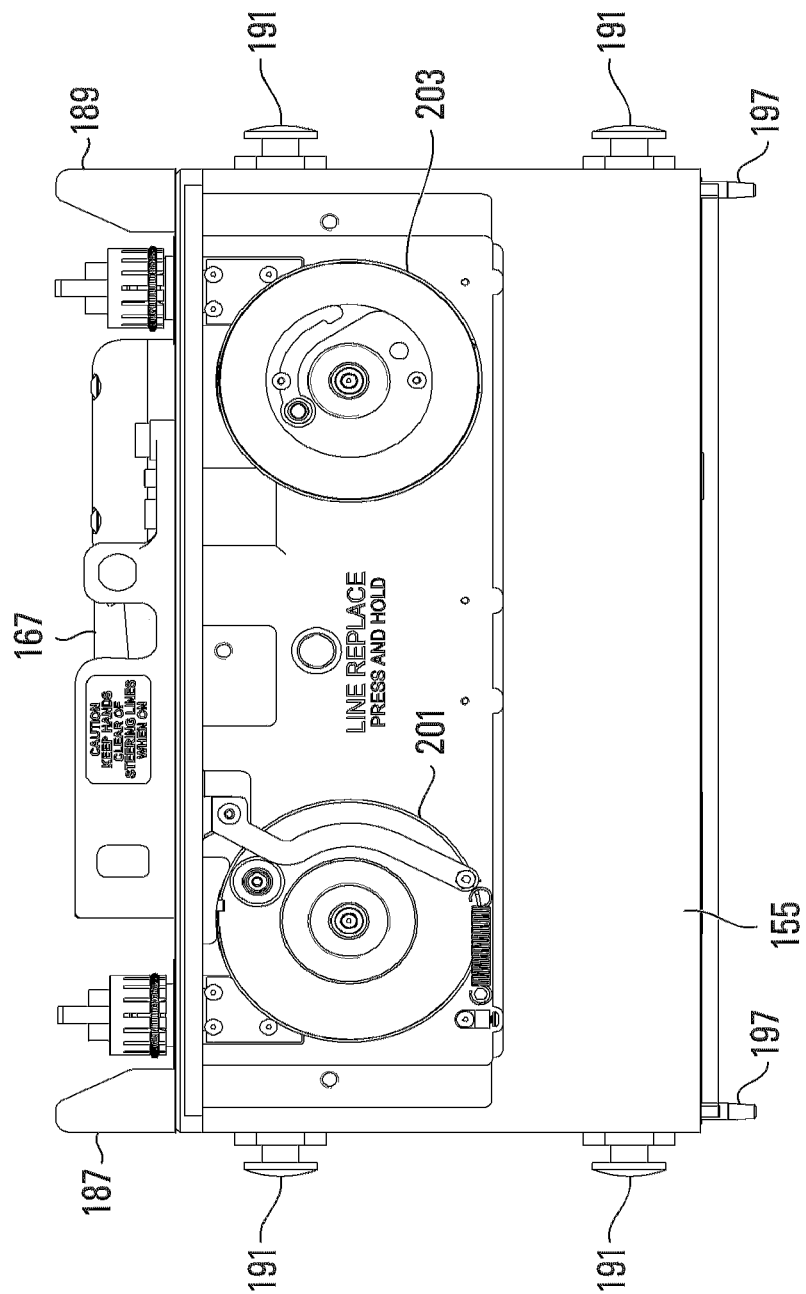
FIG. 10 shows a front view of the upper unit shown in FIG. 8, with the steering line access panel removed.

FIG. 10 shows a front view of the upper unit with the access panel open to provide access to the control line pulley mechanism, an example of which is described in more detail below.

Figure 11A:
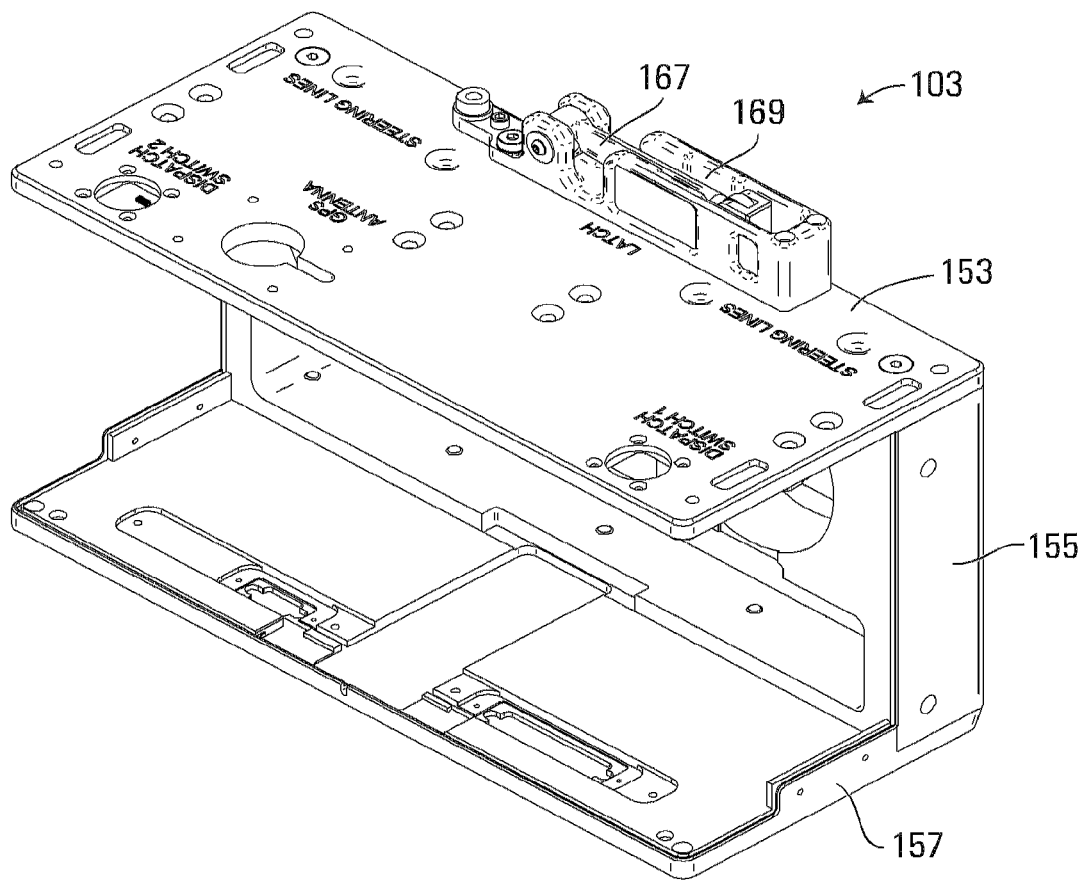
FIG. 11A shows a perspective view of a partially assembled upper unit.
Figure 11B:
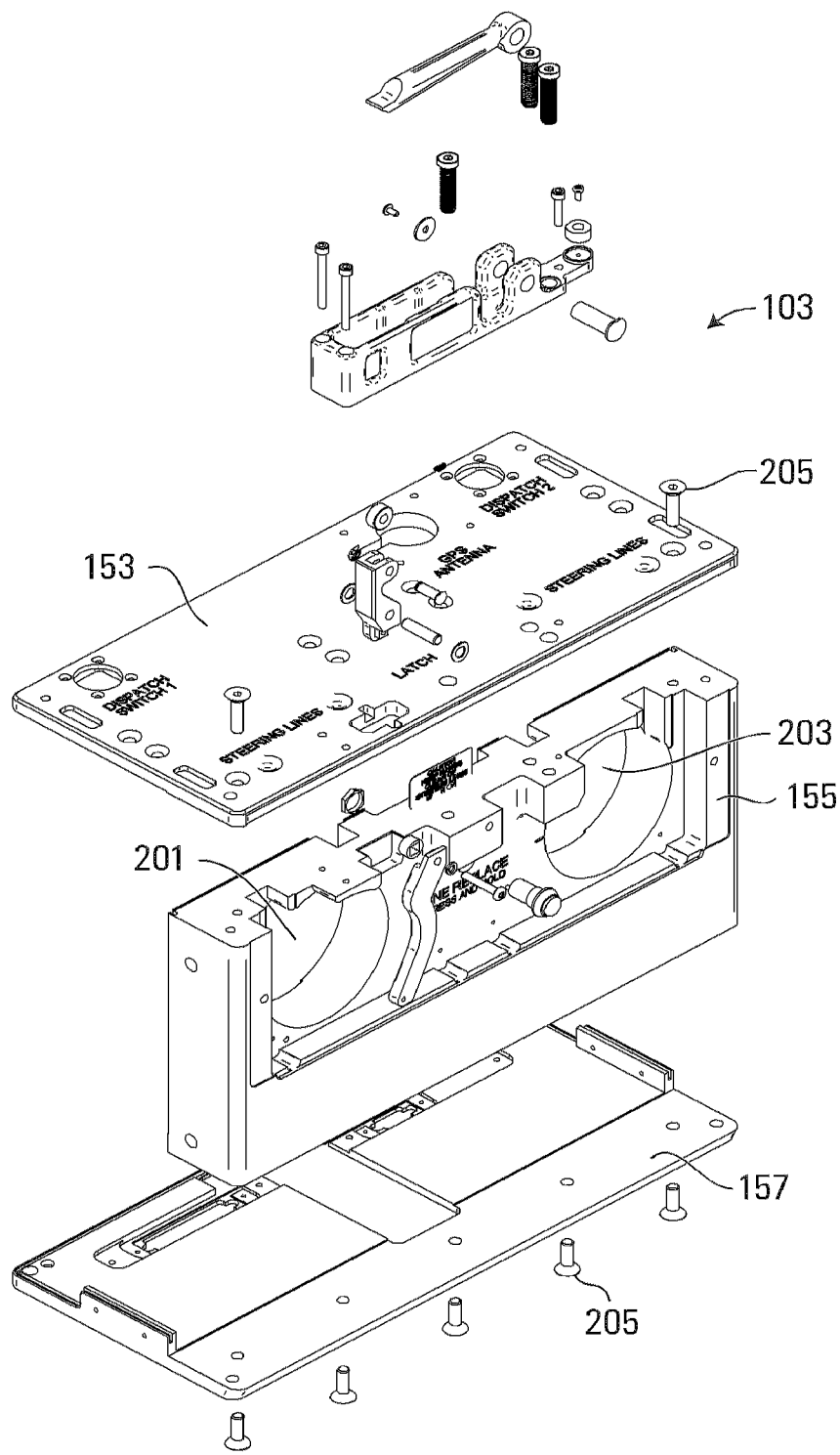
FIG. 11B shows an exploded view of the upper unit shown in FIG. 11A.

FIGS. 11A and 11B show an example of the top, bottom and front wall of the housing. The front wall 155 includes first and second circular apertures 201, 203 each for accommodating a control line pulley. The top and bottom panels 153, 157 are connected to the front wall 155 by any suitable means, such as screws or bolts 205.

Figure 12A:
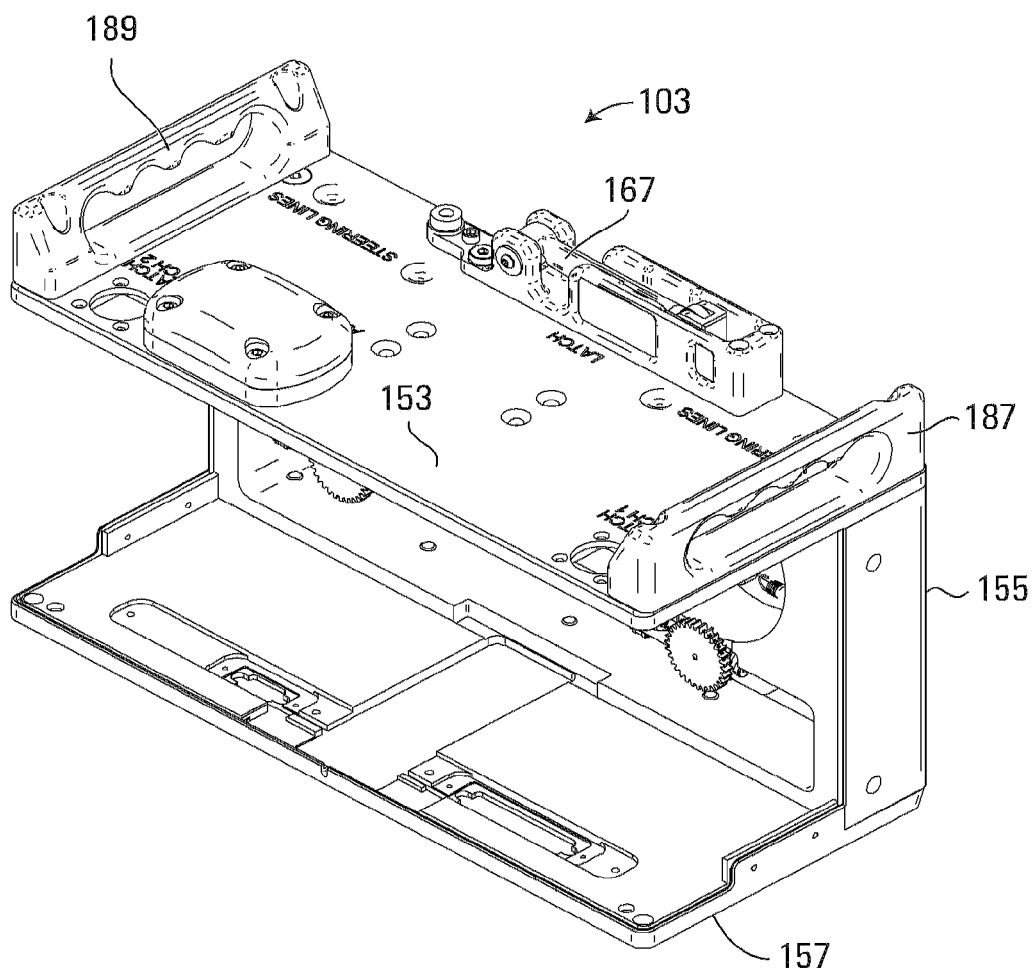
FIG. 12A shows a perspective view of a partially assembled upper unit.
Figure 12B:
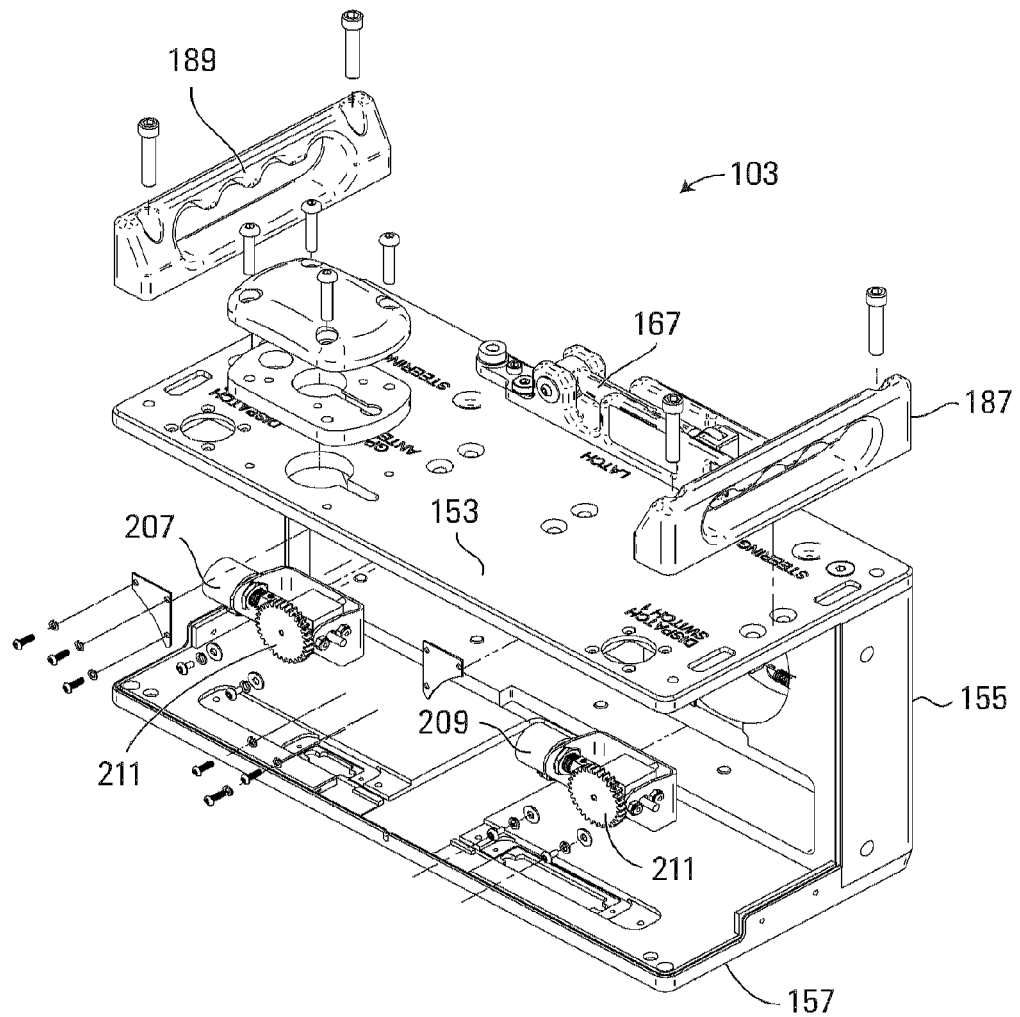
FIG. 12B shows an exploded view of the partially assembled upper unit of FIG. 12A.

Referring to FIGS. 12A and 12B, the upper unit further includes a respective sensor 207, 209 for measuring the angular position and number of revolutions of a respective pulley for use in controlling the length of the control lines that extend from the flight controller. In this embodiment, the sensors are rotatably coupled to a pulley by means of a gear 211.

Figure 13A:
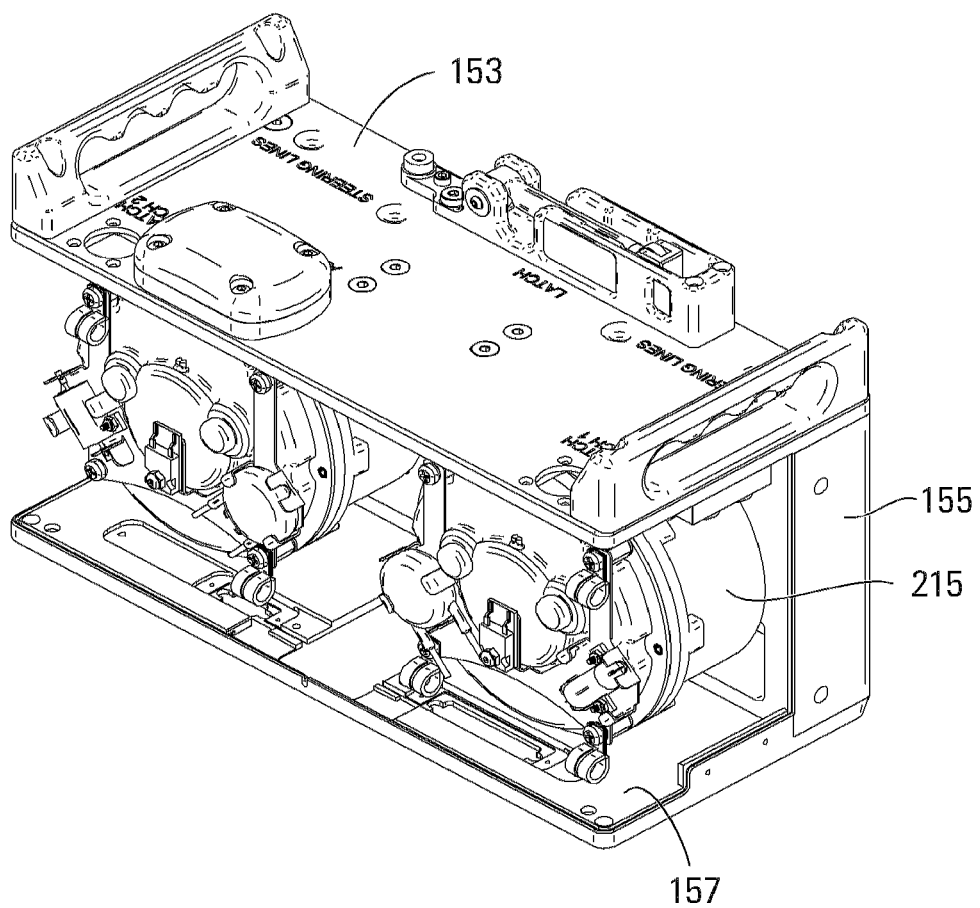
FIG. 13A shows a perspective view of a partially assembled upper unit.
Figure 13B:
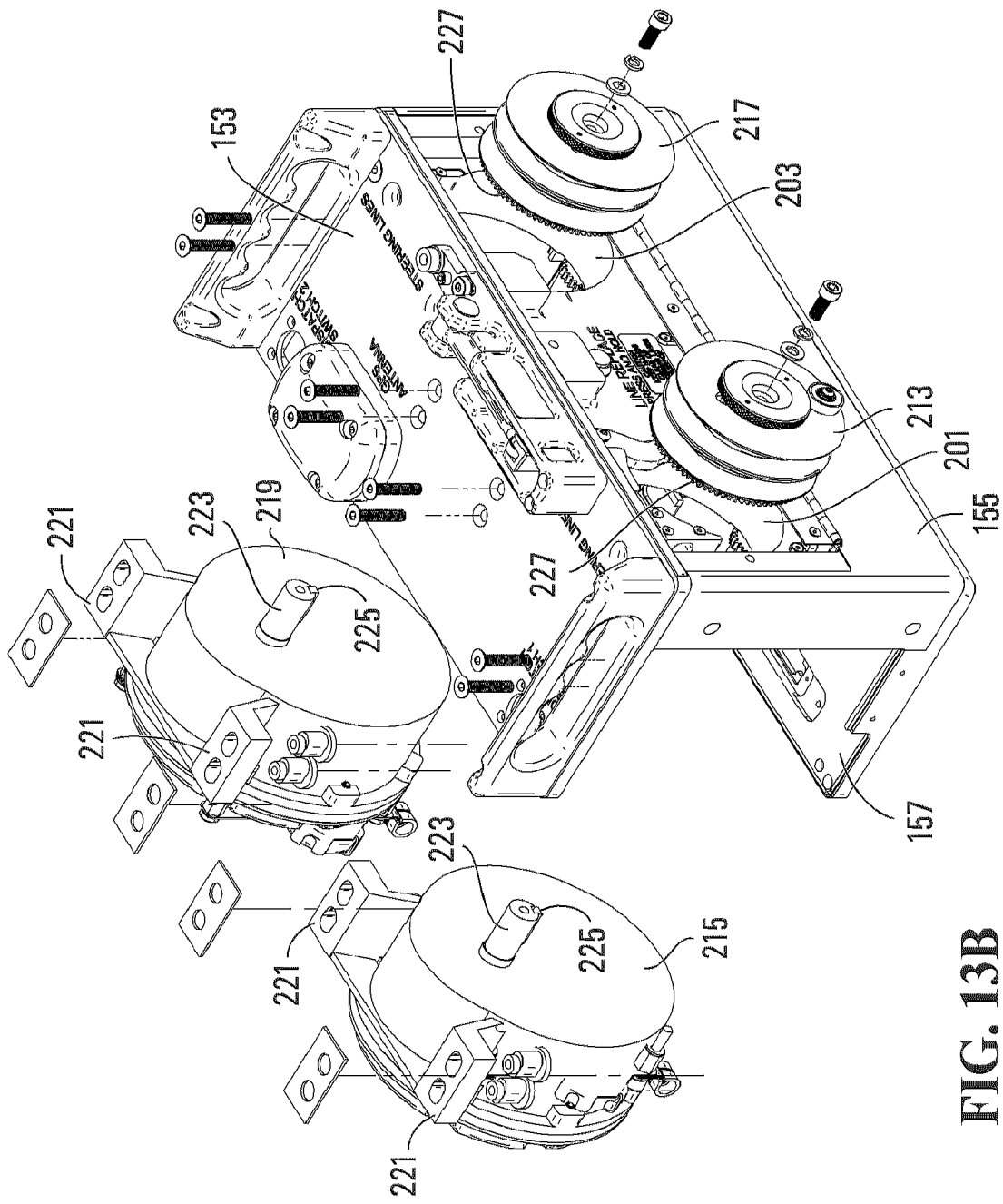
FIG. 13B shows an exploded view of the partially assembled upper unit of FIG. 13A.

Referring to FIGS. 13A and 13B, the unit includes a first pulley assembly 213 and a first motor assembly 215 which includes an electric motor for driving rotation of the pulley 213. The unit further includes a second pulley assembly 217 and a second motor assembly 219, including an electric motor for driving rotation of the second pulley. Each motor assembly 215, 219 includes mountings 221 to enable the motor assembly to be mounted to the unit. In this embodiment, the motor assemblies are mounted to the top plate of the unit, although in other embodiments, the motor assemblies may be mounted to any other suitable part of the unit. Each motor assembly 215, 219 has a driveshaft 223 for receiving a respective pulley assembly. Each drive shaft has a key 225 for locking each pulley to the driveshaft to prevent relative rotational movement between the two. Each pulley assembly includes a gear 227 which is arranged coaxially with the pulley and engages the gear 221 of a respective position sensor.

Figure 14A:
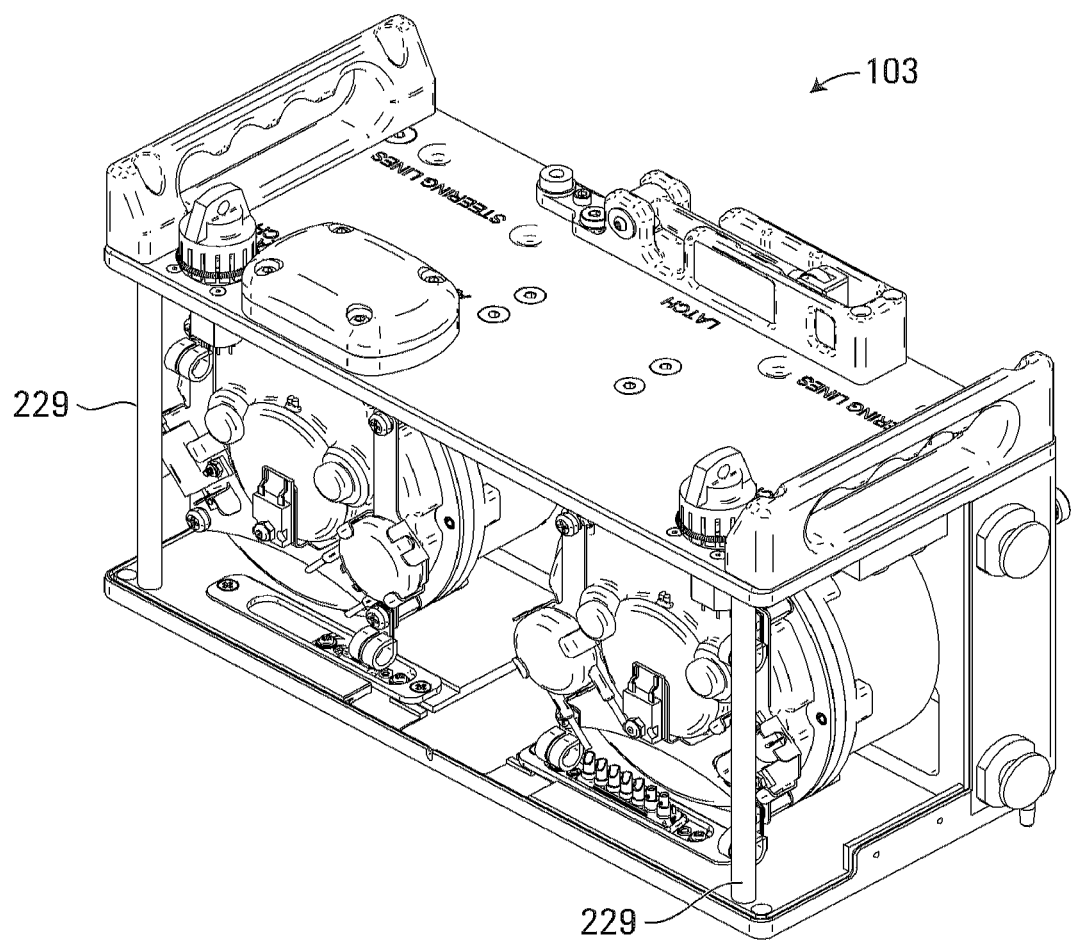
FIG. 14A shows a perspective view of a partially assembled upper unit.
Figure 14B:
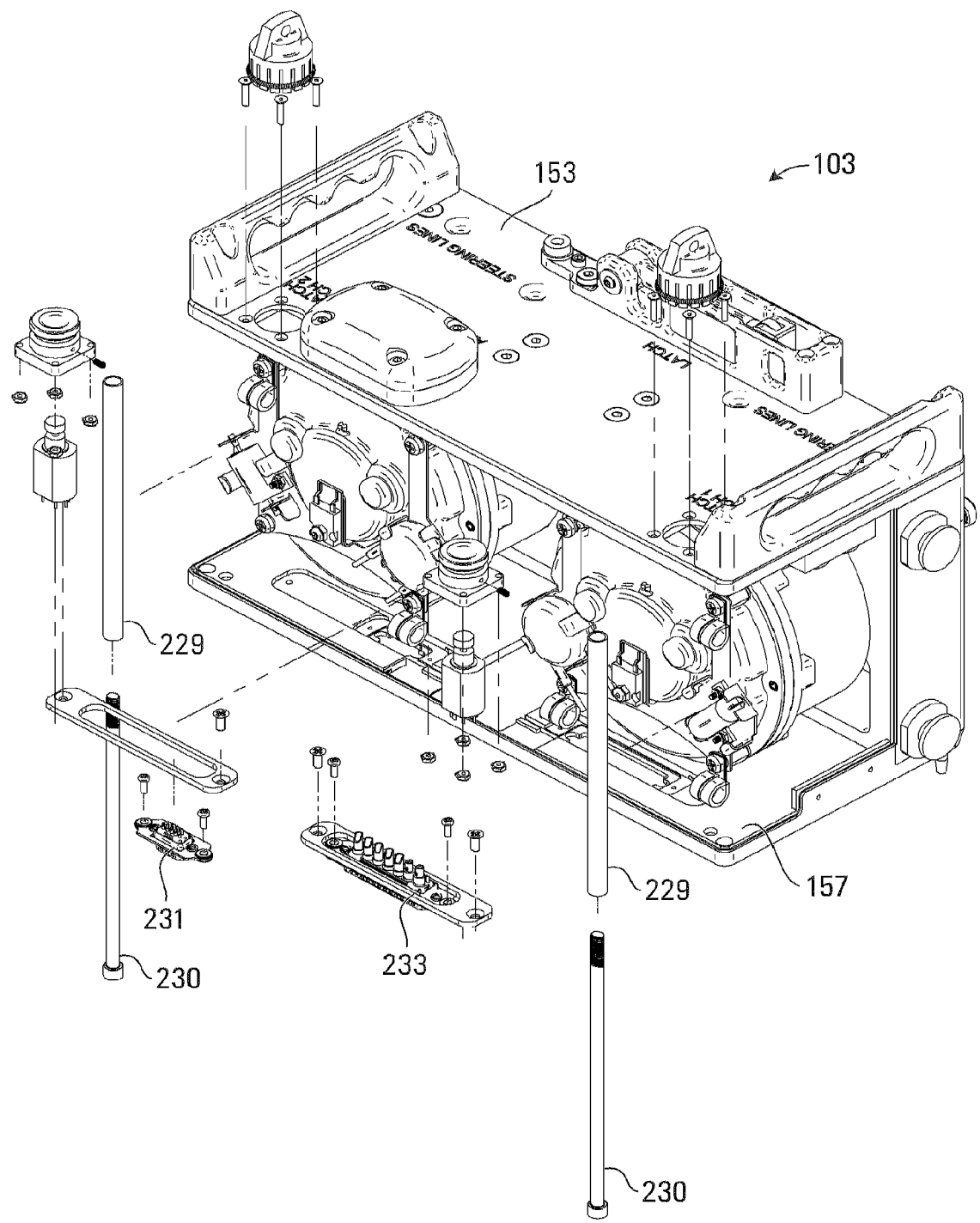
FIG. 14B shows a partially exploded view of the partially assembled upper unit of FIG. 14A.
Figure 15A:
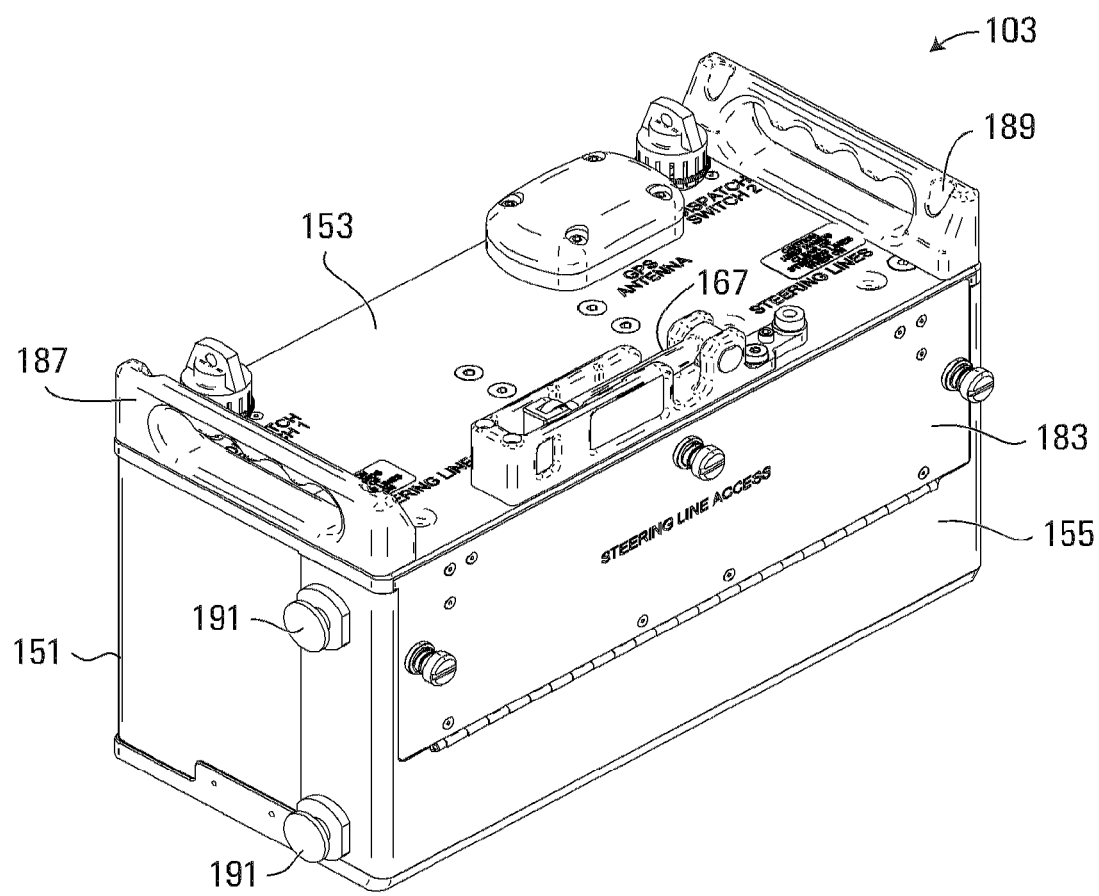
FIG. 15A shows a perspective view of an assembled upper unit.
Figure 15B:
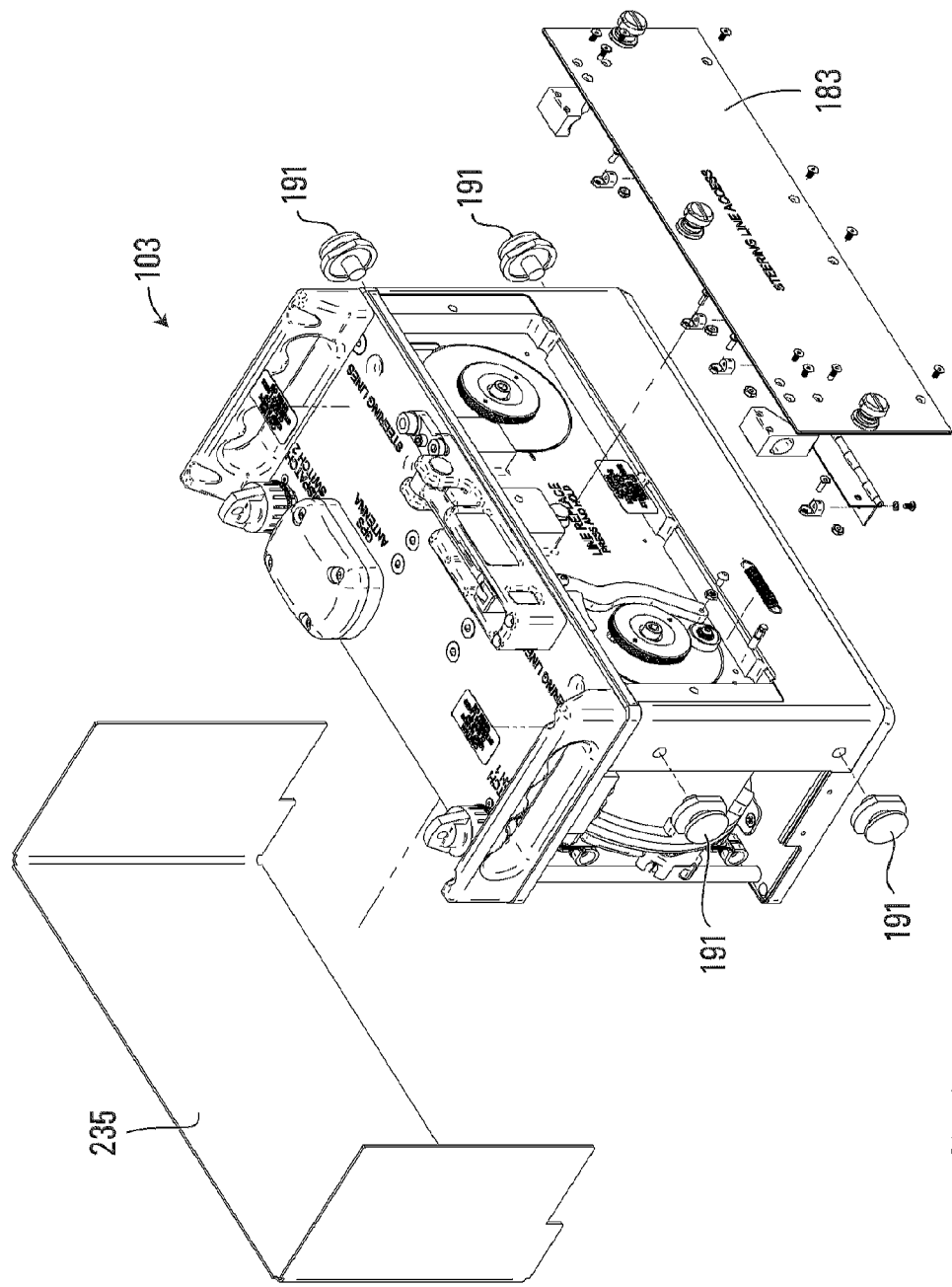
FIG. 15B shows an exploded view of the assembled upper unit shown in FIG. 15A.

Referring to FIGS. 14A and 14B, spacer members, e.g. tubular members 229 are provided on each rear corner of the unit between the upper and lower panels 153, 157. The spacers are secured between the upper and lower panels by tie rods 230 received within the tubular members. First and second interfaces 231, 233 are connected to the bottom panel 157 to enable electrical power and/or electrical signals to be exchanged between the upper and lower units. The interfaces may have the form of male and female members, for example pins and/or sockets for connecting directly to complementary sockets and/or pins of an interface in the lower unit. This direct and short connection removes the need for intervening wires or cables and their attendant disadvantages of adding possible points of failure in electrical continuity, possible snagging and additional cost. Referring to FIGS. 15A and 15B, the back and side panels may be formed from a single sheet 235 and suitably secured to the unit. FIG. 15B also shows a more detailed example of a panel access assembly.

Figure 16A:
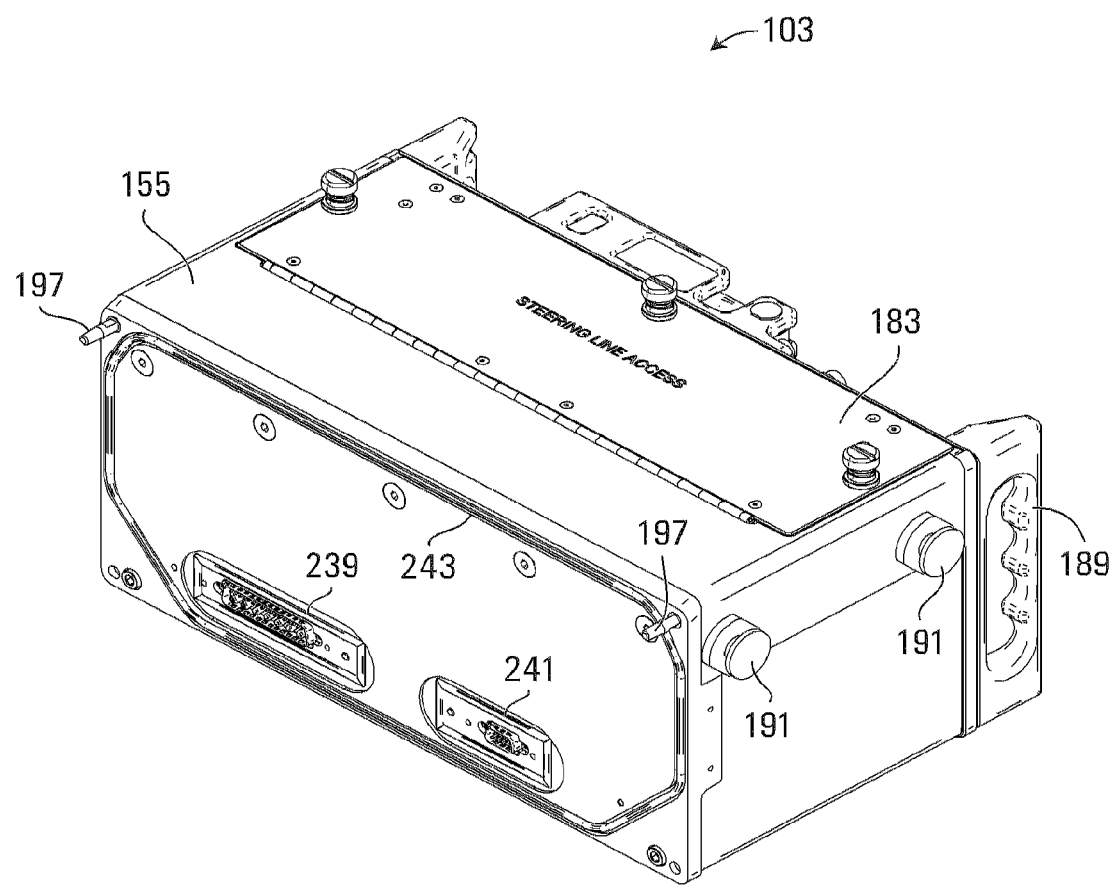
FIG. 16A shows a perspective view of the upper unit oriented to show the bottom of the unit.
Figure 16B:
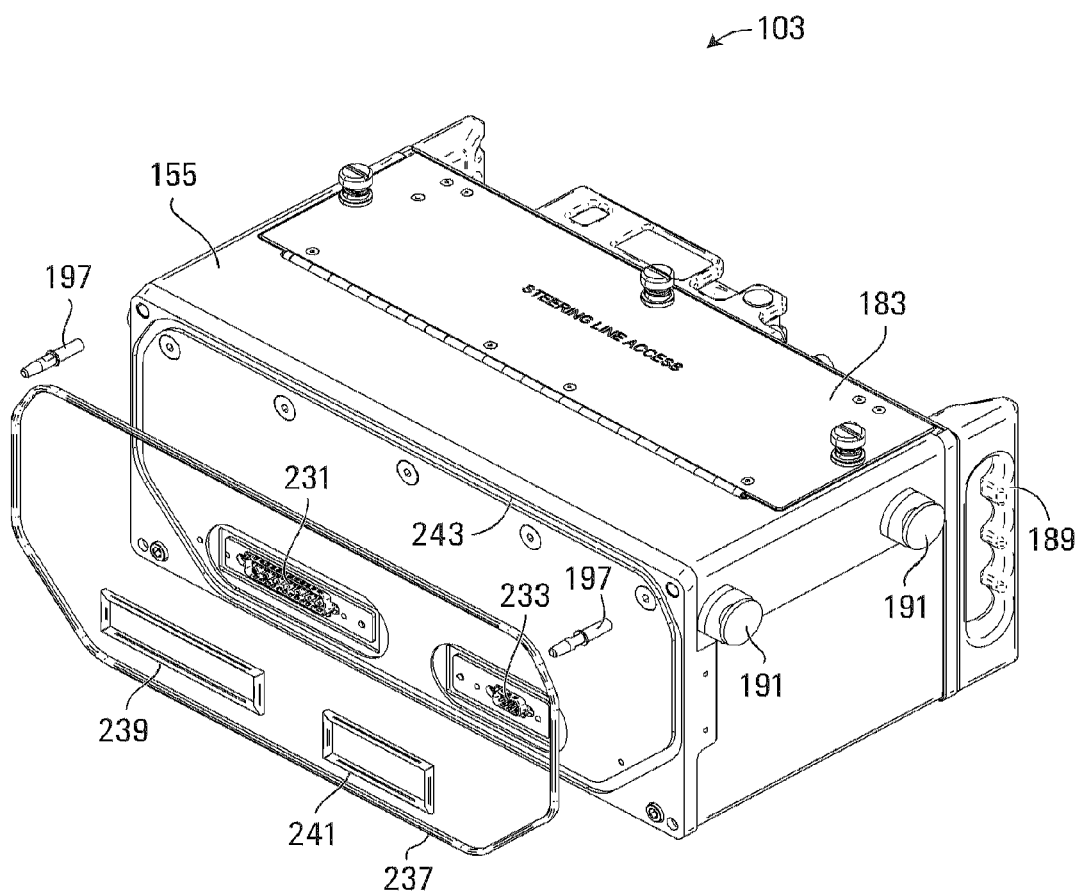
FIG. 16B shows an exploded view of components associated with the bottom of the upper unit shown in FIG. 16A.

Referring to FIGS. 16A and 16B, one or more seals may be provided to create a seal between the upper and lower units. In this embodiment, the sealing arrangement includes a peripheral seal 237 which extends around the bottom panel in proximity to the peripheral edge thereof and second and third seals 239, 241 to provide a seal around each of the first and second interfaces 231, 233. A groove 243 may be provided for receiving the peripheral seal 237. Grooves may also be optionally provided for receiving the first and second seals 239, 241.

Figure 17A:
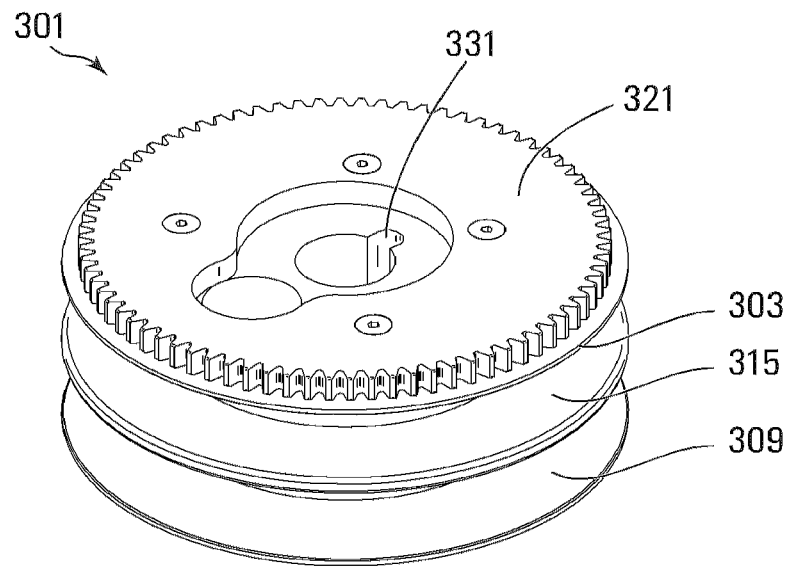
FIG. 17A shows a perspective view of one side of a pulley according to an embodiment of the present invention.
Figure 17B:
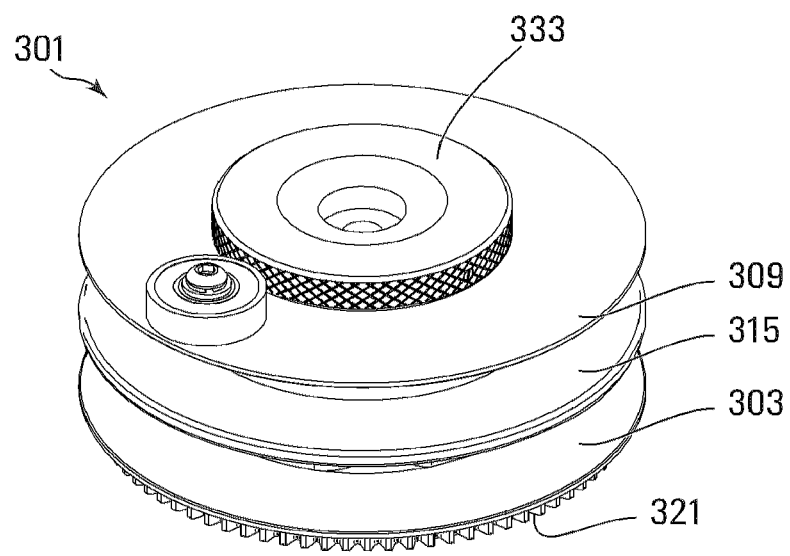
FIG. 17B shows a perspective view of the other side of the pulley shown in FIG. 17A.
Figure 17C:
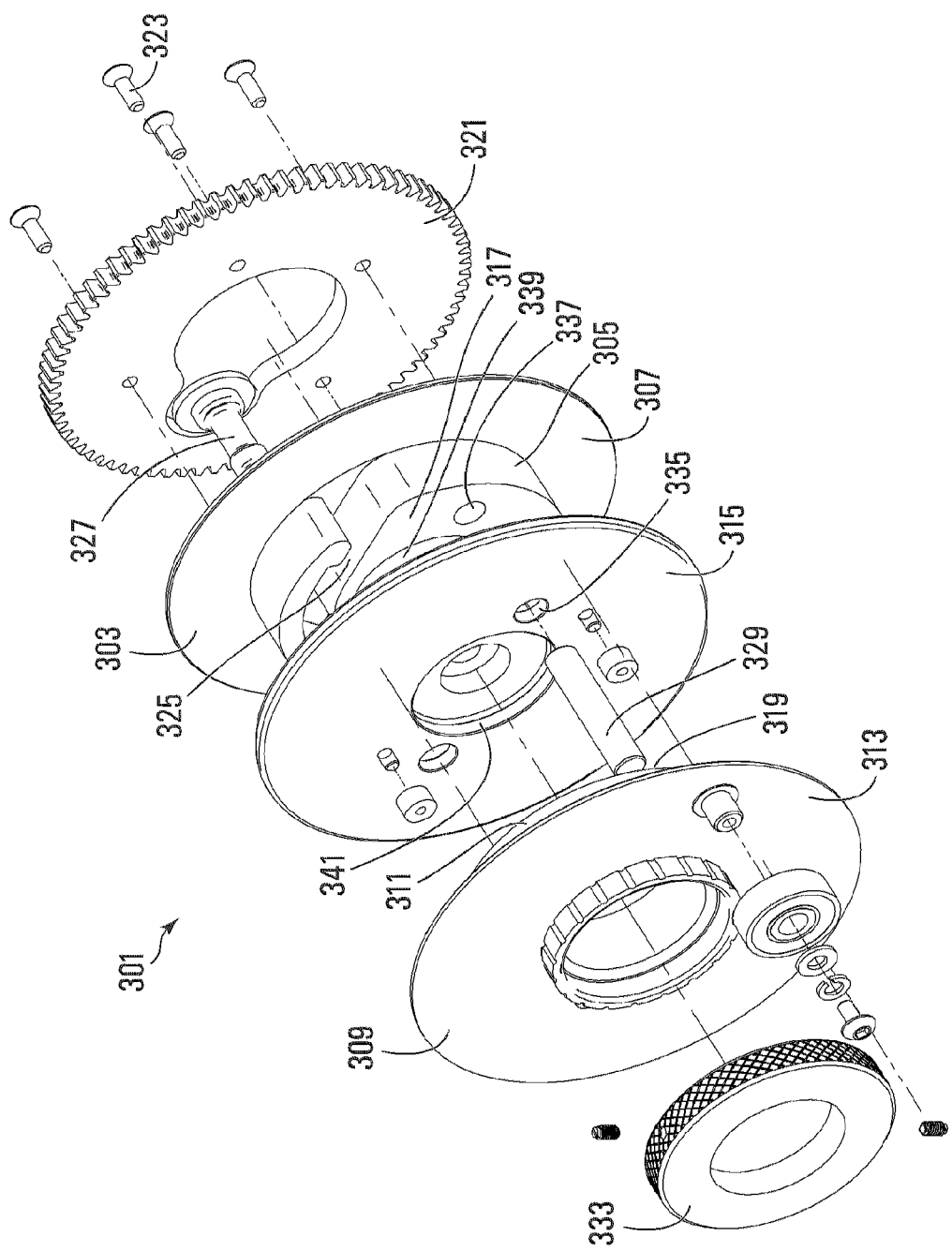
FIG. 17C shows an exploded view of the pulley of FIGS. 17A and 17B.

FIGS. 17A to 17C show an example of a control line pulley assembly according to an embodiment of the invention. The pulley assembly 301 comprises a first pulley 303 having a hub 305 and a flange 307 on one side of the hub, and a second pulley 309 having a hub 311 and a flange 303 on one side of the hub 311. The pulley assembly further includes a third flange 315 positioned between the hubs 305, 311 of the first and second pulleys 303, 309 which serves as the flange on the other side of both hubs. When the pulleys are assembled, the sides 317, 319 of each hub 307, 311 that face the intermediate flange 315 abut against a respective side of the flange 315. Thus, the shared flange 315 provides a means of separating the control lines on the two pulleys.

The pulley assembly includes a gear 321 which is positioned against the first pulley 303 and is secured thereto by a suitable fastening means, for example screws 323. Each hub 305, 311 has a slot 325 formed therein for receiving the end of a control line, and a pin 327, 329 is provided in each slot to secure the end of the control lines to a respective pulley. In use, one control line is wound clockwise about one of the pulleys and the other control line is wound counterclockwise about the other pulley. In some embodiments, the slot 325 in one hub may be positioned on one side of the rotational axis of the pulley assembly and the slot of the other hub may be provided on the other side of the rotational axis. Components of the pulley assembly have an aperture therethrough for receiving the motor driveshaft, and one or more components may include a locking feature, for example a recess or slot 331 for receiving the key of the motor shaft to rotationally lock the pulley to the shaft. The pulley assembly can then be configured to provide either a single pulley or a double pulley.

When a single pulley and control line are required, the second pulley 309 may be omitted from the assembly. When a double pulley is required, the second pulley is added to the assembly and secured against the first pulley by any suitable means, which may include for example a thumbwheel 333 or other mechanism that allows the second pulley to be added or removed relatively easily. One or more components of the pulley assembly, for example the first and second hubs and the intermediate flange may include one or more features that enable adjacent components to be registered or located with one another in a correct position. For example, the pin 329 can be used to locate the intermediate flange 315 relative to the hub 317 of the first pulley 303 by means of an aperture 335 through the intermediate flange and a hole 337 formed in the hub 317. The intermediate flange may include a hub that locates within a circular recess 339 of the first hub 317 to coaxially align the first hub and the intermediate flange. The intermediate flange 315 may include a circular recess 341 into which an axial hub (not shown) of the second pulley can be located, again to coaxially align the second pulley with the intermediate flange 315. Perspective views from each side of the assembled double pulley system are shown in FIGS. 17A and 17B.

Figure 18A:
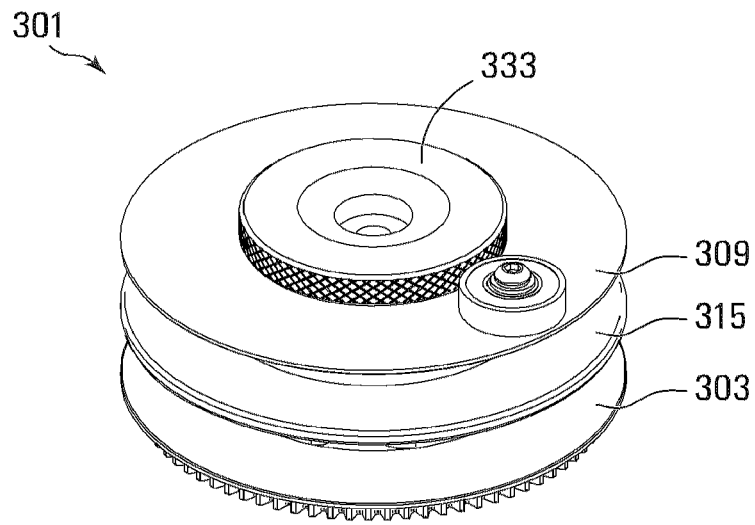
FIG. 18A shows a perspective view on one side of a pulley according to an embodiment of the present invention.
Figure 18B:
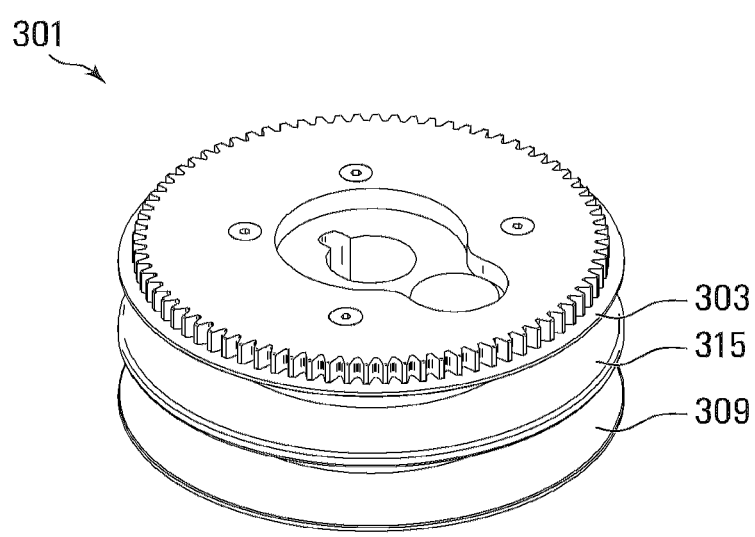
FIG. 18B shows a perspective view of the other side of the pulley shown in FIG. 18A.
Figure 18C:
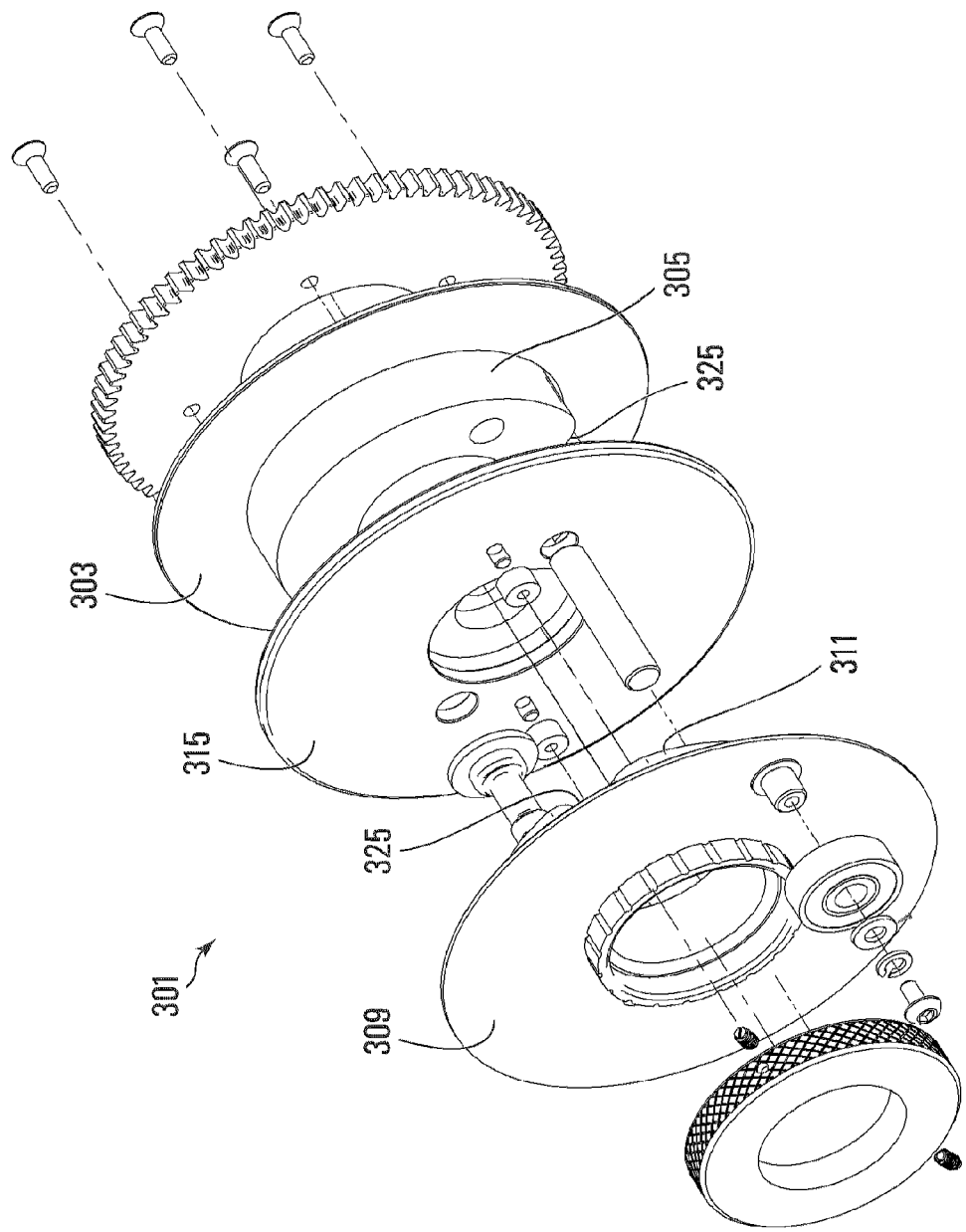
FIG. 18C shows an exploded view of the pulley shown in FIGS. 18A and 18B.

FIGS. 18A to 18C show a pulley assembly according to another embodiment of the invention. As for the embodiment of FIGS. 17A to 17C, the pulley assembly includes first and second pulleys 303, 309 and an intermediate flange 315. A slot 325 is formed in the hub 305, 311 of each pulley 303, 309 for receiving the end of a respective control line, and the control lines are secured within the slot by any suitable means, for example by a pin. As for the embodiment of FIG. 17A to 17C, the pulley assembly of FIGS. 18A to 18C can be configured either as a single pulley or as a double pulley.

Figure 18D:
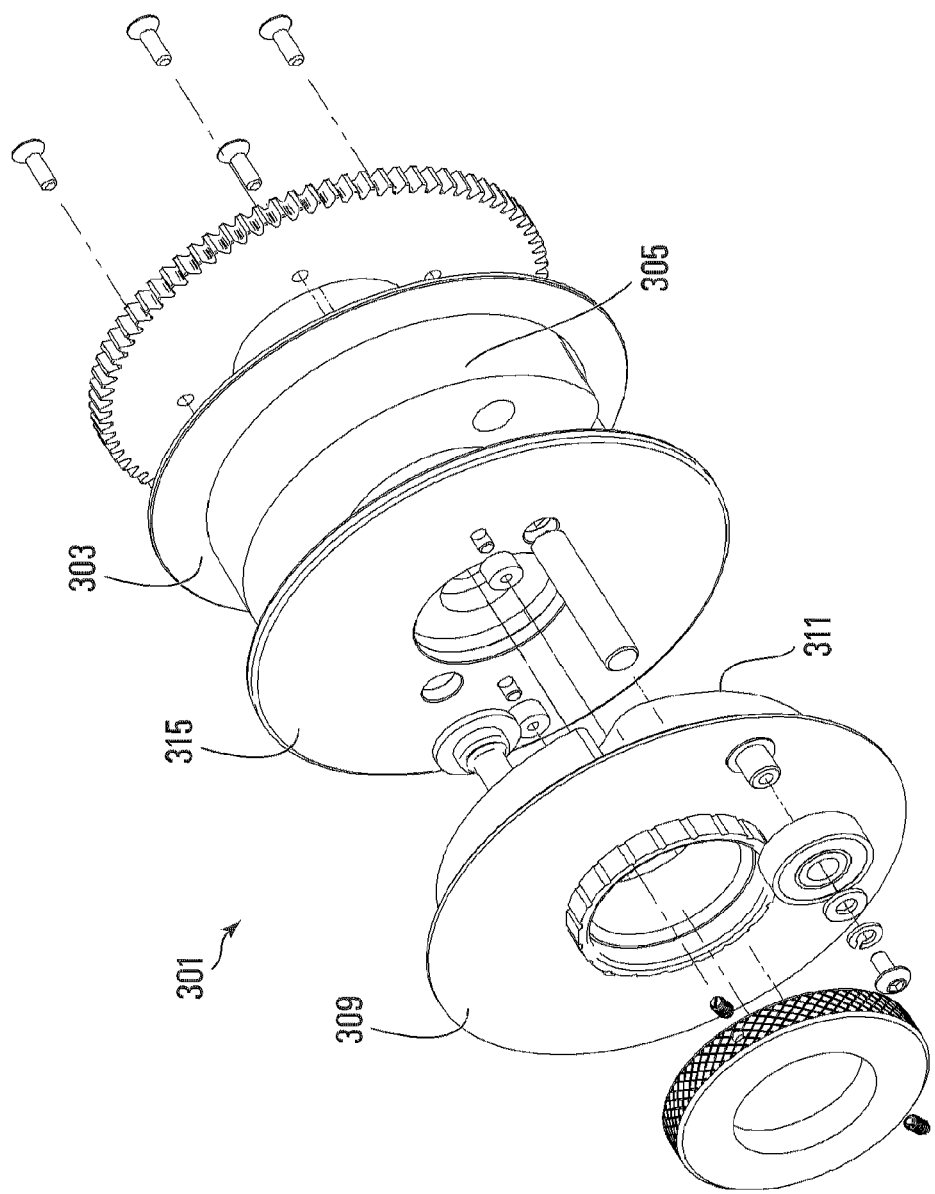
FIG. 18D shows an exploded view of another embodiment of a pulley according to an embodiment of the present invention.

FIG. 18D shows another embodiment of a pulley assembly. This embodiment differs from that shown in FIGS. 18A to 18C only in that the hubs 305, 311 have a larger diameter than the hubs of the pulley assembly shown in FIGS. 18A to 18C. The ability to reconfigure the flight controller with pulleys having different hub diameters advantageously enables the flight controller to be adapted for different applications, for example different parachutes and/or different payloads. Pulleys with larger diameter hubs enable faster changes in the length of control lines extending from the flight controller for a given speed of rotation, and pulleys with smaller diameter hubs allow a greater force to be applied to a control line for a given motor drive current. Some embodiments of the flight controller may include a set of pulleys in which the set includes at least one pulley having a hub of different diameter to the hub of another pulley.

FIGS. 18E to 18I show examples of other pulley arrangements that may be used in a flight controller of embodiments of the present invention.

Figure 18E:
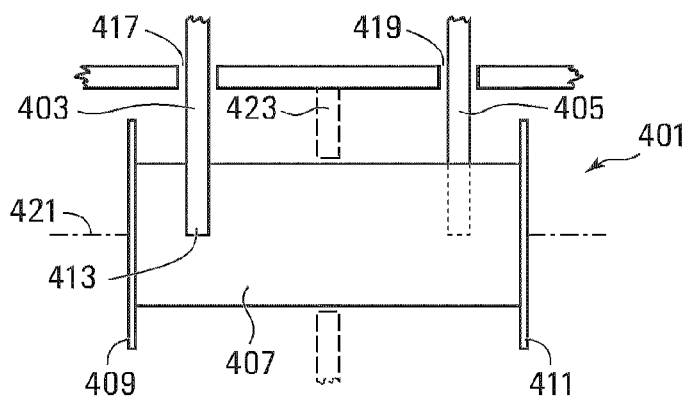
FIGS. 18E to 18I show examples of other pulley arrangements.
Figure 18F:
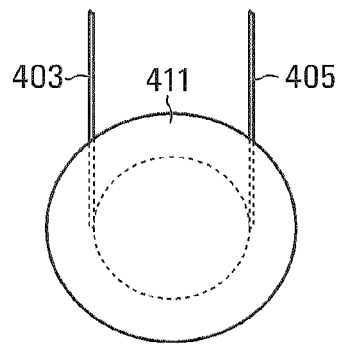

FIGS. 18E and 18F show an example of a single pulley 401 for accommodating a plurality of control lines 403, 405. The pulley 401 includes a hub 407 and opposed flanges 409, 411. The control lines 403, 405 are spaced apart on the hub 407. The ends of the control lines may be secured to the hub at axially spaced apart positions 413, 415. In other embodiments, the ends of the control lines 403, 405 may be secured to the hub at a common axial position. As shown in FIG. 18F, the control lines 403, 405 extend from opposite sides of the hub 407 so that as the pulley rotates in one direction, one of the control lines is reeled in and the other reeled out, and when the direction of rotation is reversed, the one control line is reeled out and the other reeled in.

The control line guide system may be provided to maintain separation of the control lines 403, 405. In this example, the guide system comprises first and second apertures 417, 419 for receiving a respective control line 403, 405, the apertures being spaced apart in a direction along the hub axis 421. An optional partition 423 may be provided that extends radially towards the hub from the control unit to provide further separation of the control lines.

Figure 18G:
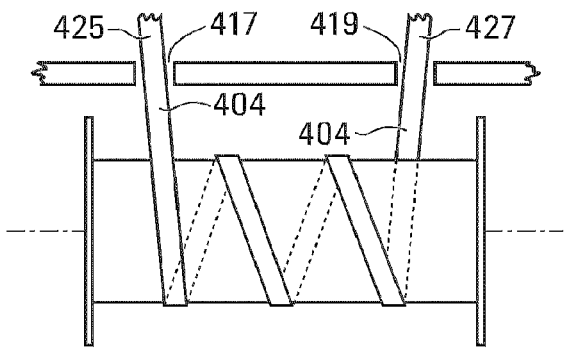
Figure 18H:
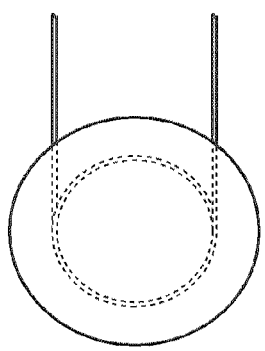

FIGS. 18G and 18H show an embodiment in which a unitary control line is wrapped one or more times around a single hub to effectively provide two control lines which act in opposition to one another. This hub includes a control line guide system which is similar to that shown in FIGS. 18E and 18F, comprising two apertures 417, 419 for receiving respective portions 425, 427 of the control line 404, the apertures being spaced apart in the direction along the axis of the pulley.

Figure 18I:
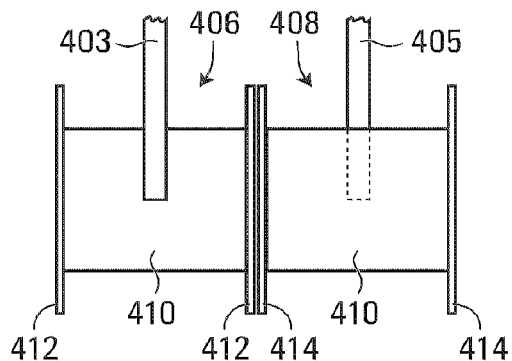

FIG. 18I shows another embodiment of a pulley assembly comprising two pulleys 406, 408 each having a hub 410 and opposed first and second flanges 412, 414. A respective control line 403, 405 is connected to each pulley. The pulley assembly may be configured either as a single or double pulley system by adding or removing the second pulley, as required. The second pulley may be mounted to one or both of the motor shaft and the first pulley. The first pulley may be permanently mounted to the motor shaft or may be removably mounted to the motor shaft.

FIGS. 19A to 19F show an embodiment of a second module of the flight controller which includes one or more electrical and/or electronic components. In this example, the module is the lower module 105 of the flight controller 101 shown in FIG. 6A. Referring to FIGS. 19A to 19F, the second modular unit has a top 503, a front 505, a back 507, a bottom 509 and right and left sides 511, 513. The top includes one or more interfaces 515, 517 for connecting to corresponding interface(s) on the bottom of the upper unit. The interfaces may include one or more male/female connectors, for example socket(s) and/or pin(s) that register with and connect to complementary pin(s) and/or socket(s) of the interface of the upper unit. As mentioned above, the interfaces enable electrical power and/or electrical signals to be communicated between the upper and lower units. The lower unit includes one or more locating features that facilitate connecting and positioning the two units relative to one another when the flight controller is assembled, and which register with one or more corresponding features of the upper unit. In this particular example, the locating features include first and second holes 519, 521 which register with corresponding protrusions or pins extending from the upper unit, and first and second protrusions or pins 523, 525 which register with corresponding holes in the upper unit. The one or more locating features may be arranged asymmetrically so that it is apparent to a user that there is only one correct orientation or position of each unit relative to the other.

Figure 19A:
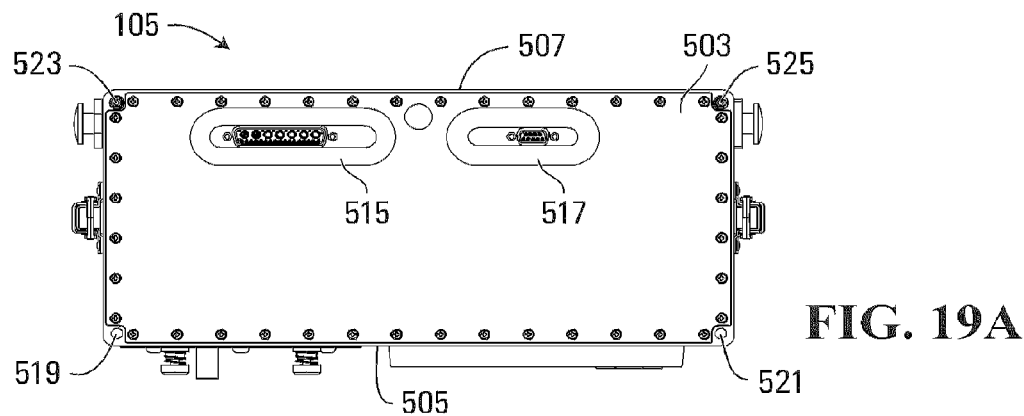
FIG. 19A shows a top view of the bottom unit of the flight controller according to an embodiment of the present invention.
Figure 19B:
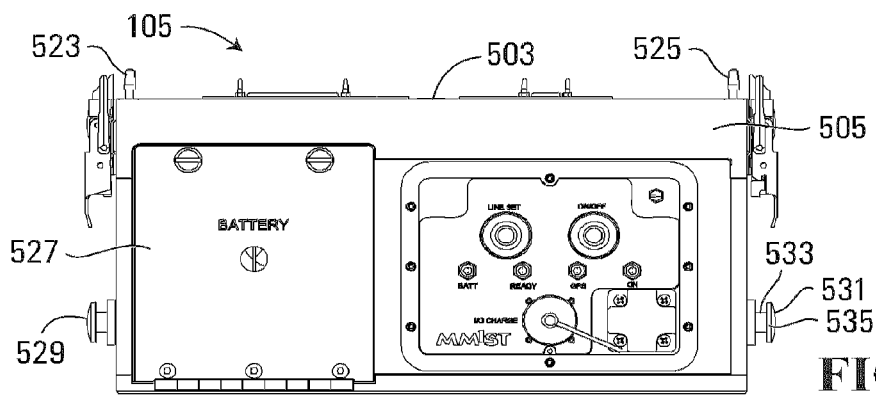
FIG. 19B shows a front view of the bottom unit shown in FIG. 19A.
Figure 19C:
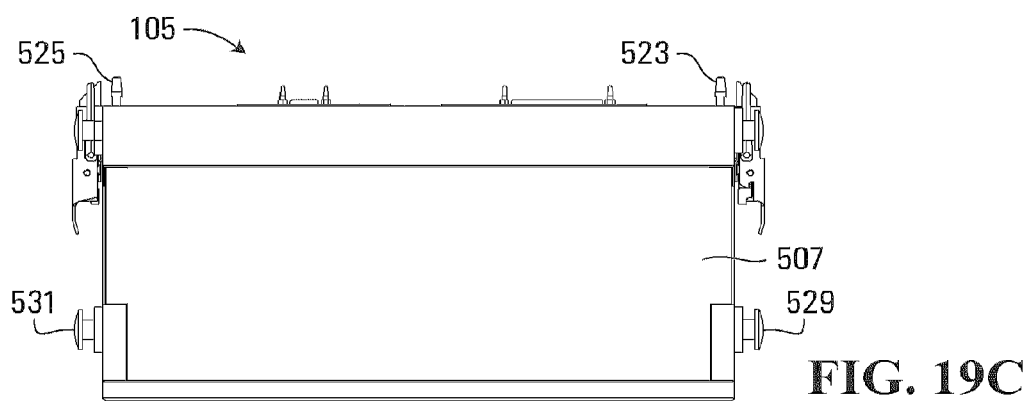
FIG. 19C shows a back view of the bottom unit of FIGS. 19A and 19B.
Figure 19D:
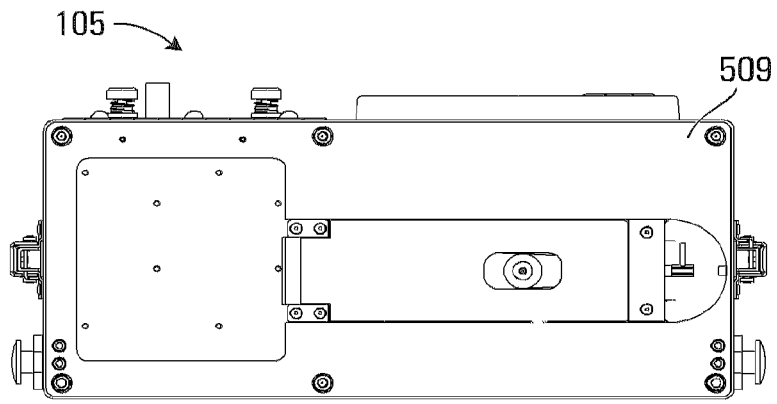
FIG. 19D shows a bottom view of the bottom unit of FIGS. 19A to 19C.
Figure 19E:
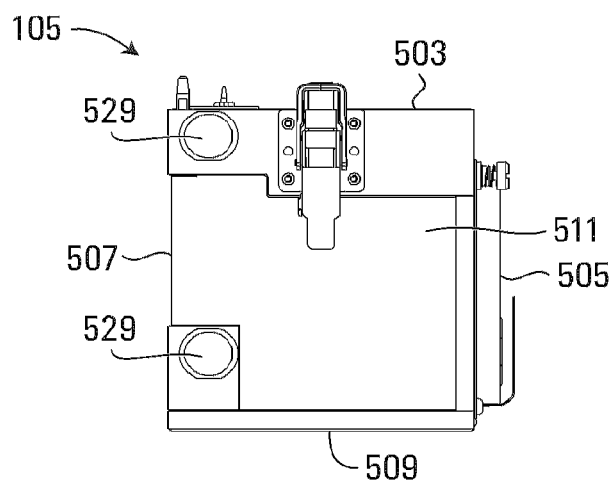
FIG. 19E shows a right-side view of the bottom unit of FIGS. 19A to 19D.
Figure 19F:
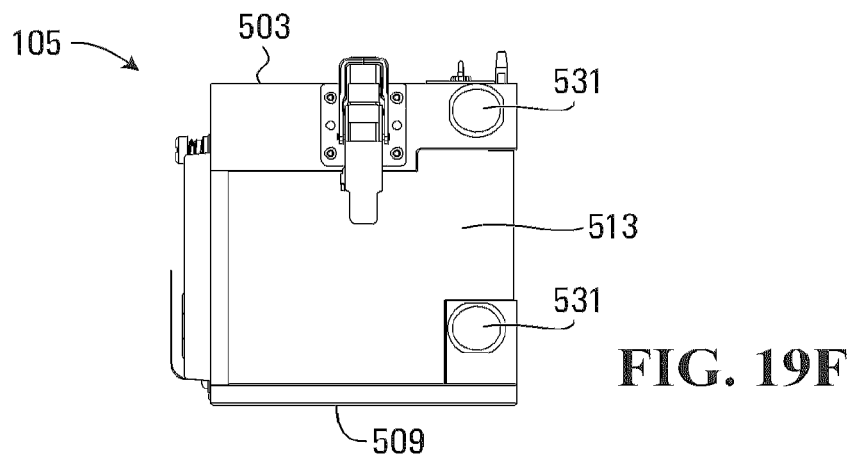
FIG. 19F shows a left-side view of the bottom unit of FIGS. 19A to 19E.

Referring to FIG. 19B, the lower unit includes an electrical power source, for example a battery. The battery is accommodated in a battery housing and an individual releasable panel or door 527 may be provided in the lower unit to enable access to the battery housing. In this embodiment, the battery access panel 527 is hingedly connected to the lower unit, although in other embodiments, the panel may be completely removable.

The lower unit may include circuitry which controls power/current to drive the pulley motors in the upper unit. The lower unit may further include circuitry which translates or converts information about the present and target positions of the flight controller into currents of appropriate magnitude and duration to control the control line pulley motors. The circuitry may also comprise a receiver for receiving wireless communication signals for providing positional information to the flight controller. The receiver may include a global positioning system (GPS) or global navigation system (GNS) for receiving GPS signals from an appropriate source, for example, global positioning satellites. Alternatively, or in addition, the flight controller may include circuitry which is responsive to signals emitted from one or more ground based transmitters which cause the flight controller to control the flight of the parachute towards a desired target location.

The lower unit may include one or more connectors 529, 531 for connecting the lower unit to the side support plates 109, 111, shown for example in FIGS. 7A to 7C. In this embodiment, each connector member includes a shank 553 and an enlarged head 535.

An example of a connection mechanism for releasably connecting the support side plates to the upper and lower units of the flight controller will now be described with reference to FIGS. 20A to 20D.

The side plate 111 has first and second apertures 551, 553 for receiving a respective connector of the upper unit, and third and fourth apertures 555, 557 for receiving respective connectors of the lower unit. The apertures include an enlarged portion 558 which is sized to receive the enlarged head of the connector, and a reduced portion 559, which in this embodiment is in the form of a slot that has a width which is smaller than the diameter of the enlarged head, but is sized to accommodate the shank of the connector.

Figure 20A:
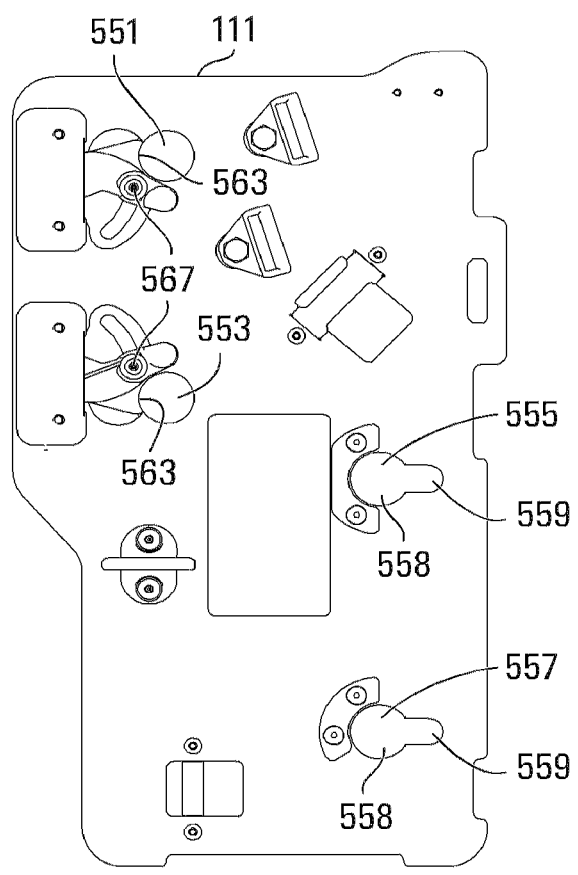
FIG. 20A shows a plan view of one side of a support plate according to an embodiment of the present invention.
Figure 20B:
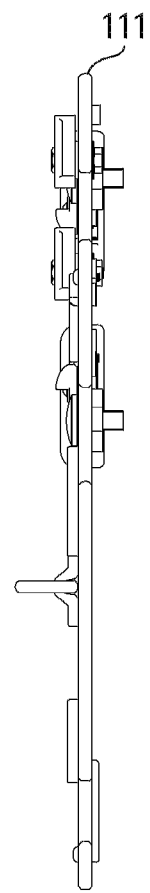
FIG. 20B shows a side view of the support plate of FIG. 20A.
Figure 20C:
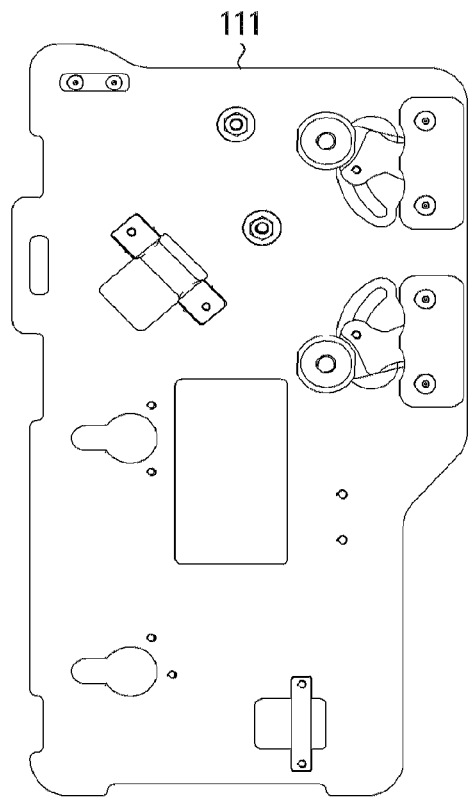
FIG. 20C shows a view of the support plate from the other side to that of FIG. 20A.
Figure 20D:
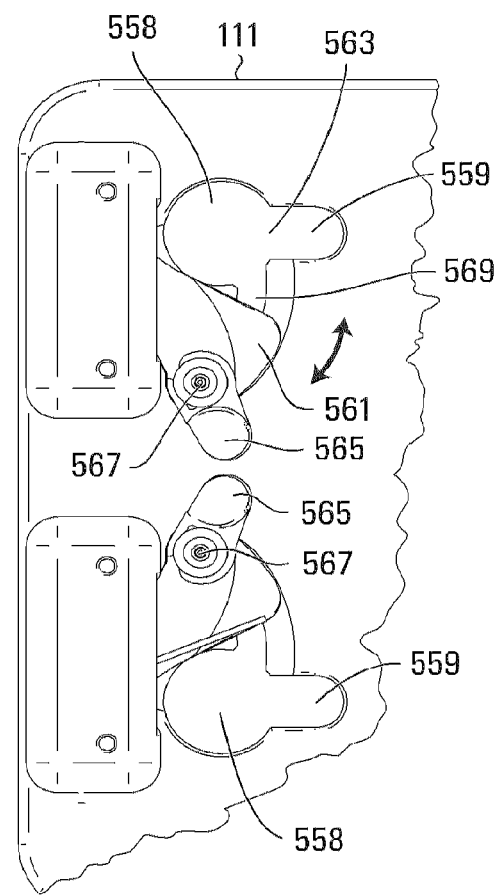
FIG. 20D shows a more detailed view of a latching mechanism of the support plate according to an embodiment of the present invention.

Each of the first and second slots 551, 553 has an associated quick release locking mechanism which locks the connector in the reduced aperture 559, thereby preventing movement of the connector into the enlarged portion 558. In this example, and as best shown in FIG. 20D, the locking mechanism comprises a cam 561 which is rotatably mounted on the plate 111 and is capable of swinging towards and away from the aperture 559. In a first position, as shown in FIG. 20D, the cam 561 is clear from the enlarged aperture portion 558, thereby allowing the head of the connector to pass therethrough. In a second, locking position, as shown in FIG. 20A, the cam at least partially or fully extends across the junction 563 between the enlarged and reduced portions of the aperture, thereby preventing the connector from moving into the enlarged aperture portion. A lever 565 or other feature may be provided to facilitate manual operation of the cam. In this example, a mechanism is provided to help prevent the cam moving outwardly away from the side plate. The mechanism may include a pin 567 which passes through the cam and/or lever 565 and rides in a guide slot 569. One end of the pin is secured to the cam and the other end includes an enlarged head on the other side of the plate which has a greater diameter than the width of the guide slot.

In some embodiments, biasing means may be provided to bias the cam towards the locked position. The biasing means may comprise a spring or other resilient means, for example. In this particular embodiment, a locking mechanism is not provided for each of the apertures for the lower unit. However, in other embodiments, a locking mechanism may be provided for one or more of the lower apertures. In other embodiments, a locking mechanism may be provided on only one aperture of a side plate or on more than one aperture of a side plate, and the locking mechanism(s) may be provided either for the upper unit only, the lower unit only, or both the upper and lower units.

Figure 21:
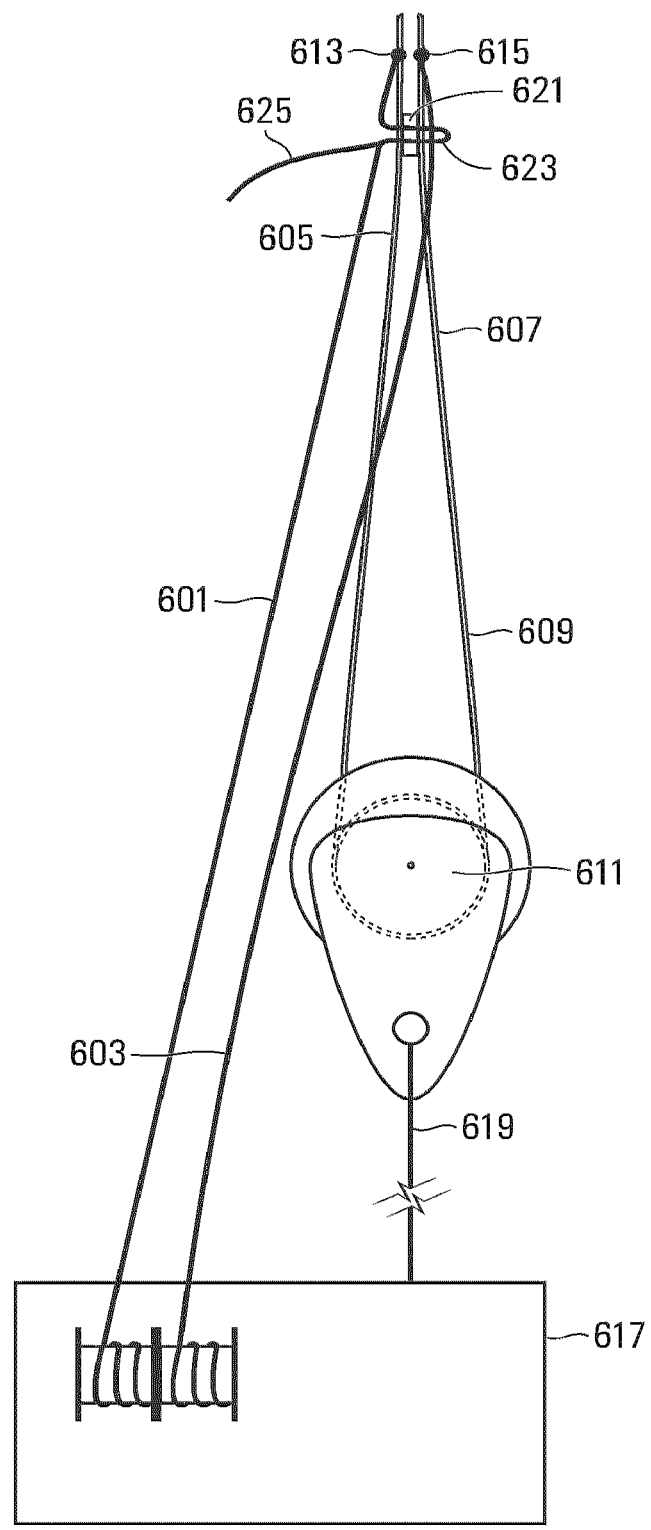
FIG. 21 shows an arrangement for managing loading on the control lines during deployment of the parachute.

In some embodiments, the aerial delivery system is arranged to reduce the risk of the control lines taking the weight of either the control unit or the payload during deployment of the parachute. Referring to FIG. 21, the control lines 601, 603 are connected to a respective side 605, 607 of a coupling line 609 that extends either side of the pulley 611. The control lines are connected thereto at desired positions 613, 615. It will be appreciated that with the pulley 611 positioned centrally on the coupling line 609 between the connection points 613, 615 of the control lines, no force need be applied on the control lines by the weight of the control unit 617 and the payload (not shown), if the length of the control lines extending from the flight control unit 617 are sufficiently long, as shown in FIG. 21. Rather, the load of the flight controller and payload are transferred to the parachute suspension lines which are connected to the coupling line 609 through a riser 619 connected between the pulley 611 and the flight controller 617. However, if the aerial delivery device deploys in a manner in which the length of the coupling line on one side of the pulley between the pulley and the connection point is longer than the length of the coupling line on the other side of the pulley between the pulley and the other connection point, it is possible that if the length of the control lines extending from the flight control are not sufficiently long, one of the control lines could take part or all of the weight of the flight controller and/or payload during deployment. Some embodiments include an arrangement which tends to limit the displacement of the coupling line 609 on one side of the pulley 611 relative to that of the coupling line on the other side of the pulley 611, which in turns limits relative displacement between the pulley 611 and the connection points 613 during deployment, and in some embodiments limits relative displacement of the control line connection points 613, 615. In one example, the limiting mechanism comprises a connector or connection means 621 for connecting the coupling line 605 on one side of the pulley to the coupling line 607 on the other side of the pulley. The connector or connection means may for example comprise a three ring connection system, as is known to those skilled in the art, or another type of connector. A mechanism may further be provided to release the connector at a suitable time, for example after the parachute has fully deployed and the aerial delivery system has stabilized. The release mechanism may be controlled by the flight controller. In one embodiment, the release mechanism is controlled by one or both of the control lines 601, 603. In one example, a portion 623 of a control line is used to maintain the connector in the closed position, and on pulling the control line, the control line is released, thereby releasing the connector. Alternatively, or in addition, a rip cord or other feature 625 coupled to one or more control lines may be used to release the connector 621.

Figure 22C:
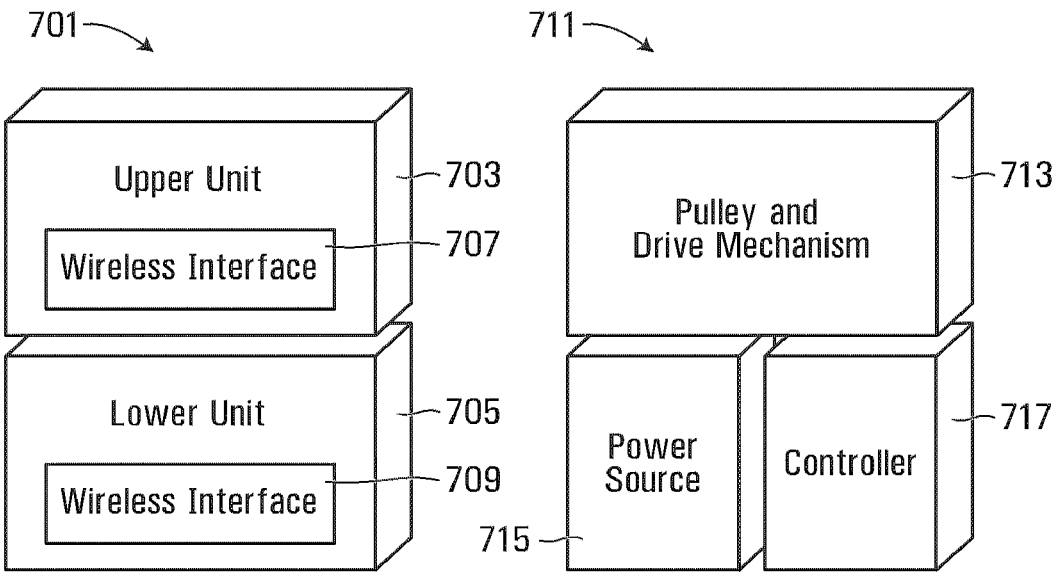
FIG. 22C shows a modular flight controller according to another embodiment of the present invention.
Figure 22C:
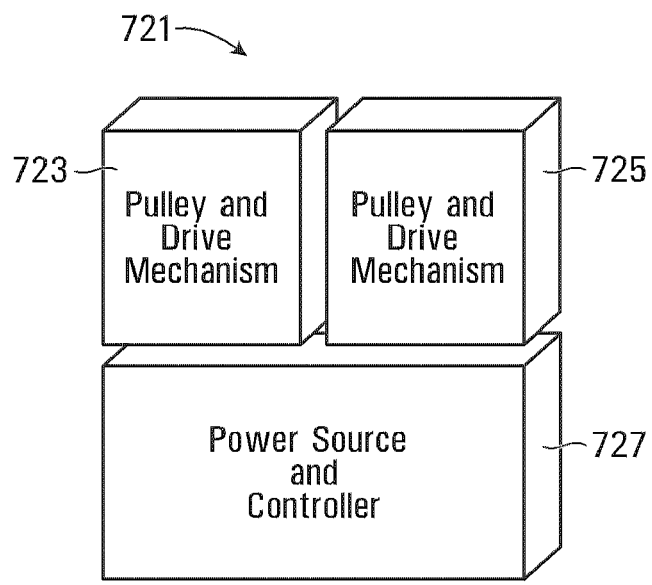

FIGS. 22A to 22C show embodiments of a modular flight controller according to embodiments of the present invention. Referring to FIG. 22A, the flight controller 701 includes upper and lower units 703, 705. The upper unit may include a mechanism for driving relative movement between the external bearing member, e.g. external pulley, and the support member extending between suspension lines of the parachute, and the lower unit 705 may include a controller for controlling the relative movement. In this embodiment, the upper and lower units each include a wireless interface 707, 709 to enable wireless communication between the upper and lower units and in a particular embodiment, to enable control signals to be passed from the lower unit to the upper unit for controlling operation thereof. Advantageously, the provision a wireless interface removes the need for a physical interface with physical connectors between the modular units and their susceptibility to damage when the upper and lower units are separated, for example. The wireless interfaces may be partially or fully enclosed within the housing of the respective units. In this embodiment, the upper unit may include an electrical power source for providing electrical power to the drive mechanism, and the lower unit may include its own separate power source for providing electrical power to the controller. In other embodiments, the lower unit may include a power source for the upper unit and the flight controller may include a connector to enable power to be supplied from the lower unit to the upper unit.

FIG. 22B shows another embodiment of a modular flight controller 711 comprising an upper unit 713 and first and second lower units 715, 717. In this embodiment, the upper unit includes a drive mechanism for driving relative movement between the bearing member and the support member, for example one or more pulleys and one or more pulley drive motors. The first lower unit 715 includes a power source and the second lower unit 717 includes a controller for controlling operation of the upper unit 713. In this embodiment, the power source resides in a separate module which may be individually removable from the flight controller, i.e. capable of being removed without separating or removing the other modules of the flight controller. Likewise, the upper unit 713 and the second lower unit 717 may also be individually separable from each other module of the flight controller so that each may be individually removed or replaced.

FIG. 22C shows another configuration of a modular flight controller. In this embodiment, the flight controller 721 includes first and second upper units 723, 725 and a lower unit 727. Each of the first and second upper units 723, 725 includes a drive mechanism for driving relative movement between a bearing member and a support member extending between suspension lines of a parachute. The first upper unit may for example include one or more pulleys and a drive motor for driving rotation of the pulleys to operate a control line that may be similar to any of the embodiments described above. Likewise, the second upper unit 725 may also include one or more pulleys and a drive mechanism for driving rotation of the pulleys for controlling a second control line. The control line or control lines of each upper unit may control vertical displacement of suspension lines in opposite quadrants of a parachute. The lower unit includes a power source and a controller. In other embodiments, the lower unit may be separated into two separate modules, for example similar to the lower units described above in connection with FIG. 22B.

Any of the embodiments of the flight controller disclosed herein may be configured as a modular flight controller in accordance with any of the configurations of FIGS. 22A to 22C or any other modular configuration. Any of the modular flight controllers described herein may include one or more wireless interfaces to enable separate modules to exchange signals therebetween. Another aspect of the invention provides a modular flight controller including a wireless interface for exchanging signals between at least first and second modules.

Figure 23A:
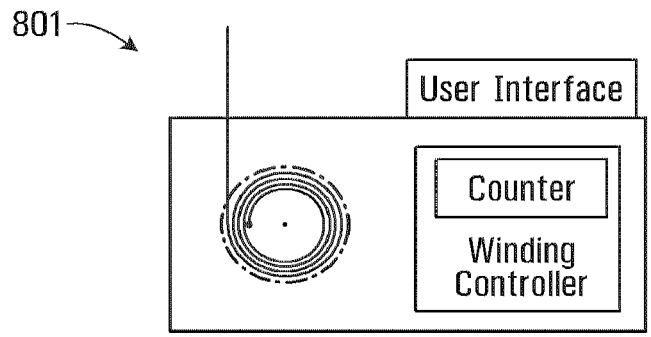
FIG. 23A shows a pulley winding controller according to an embodiment of the present invention in which a first controller line is wound onto a pulley.
Figure 23B:
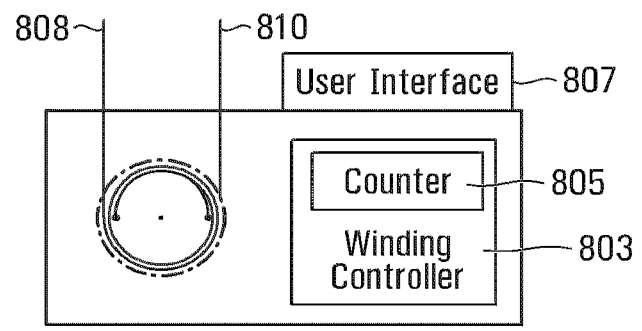
FIG. 23B shows a view of the winding controller of FIG. 23A in which the second control line is also wound onto a pulley.
Figure 23C:
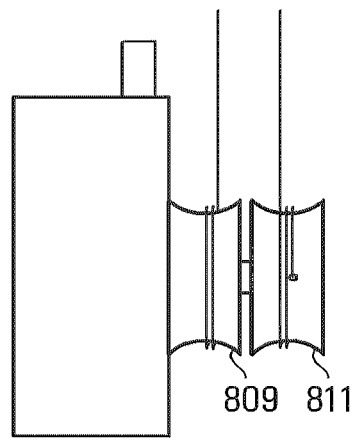
FIG. 23C shows an alternative view of the pulleys of FIGS. 23A and 23B.

FIGS. 23A to 23C show an embodiment of a pulley winding controller for controlling the winding of control lines onto a pulley assembly of the flight controller. In this embodiment, the flight controller 801 includes a pulley winding controller 803 which may include a counter for determining the amount by which a pulley has rotated from an initial position, i.e. the number of turns, for example both complete turns and fractional amounts of a single turn. The flight controller may include a user interface 807 to enable a user to communicate with the winding controller.

The winding controller facilitates the initial winding of first and second control lines on the pulley assembly when the control lines are initially attached thereto.

In one non limiting illustrative example of a mode of operation of the winding controller and how it may be used to facilitate initial winding of the first and second control lines, in a first step, a first control line is connected to a first pulley 809, a user initiates winding of the first control line through the user interface and the winding controller starts the winding process and terminates the winding process when the first pulley has rotated a predetermined amount. The predetermined amount may be specified by the user through the user interface or may be a predetermined amount previously recorded in the flight controller. In a second step, a user attaches a second control line 810 to a second pulley 811 and initiates winding of the second control line on the second pulley through the user interface. The winding controller controls the amount by which the second pulley is rotated which may be specified by the user through the interface just before the second winding session begins or may be a previously recorded amount.

In this embodiment, the first and second control lines are mounted on opposite sides of the first and second pulleys so that when one control line is reeled in, the other is reeled out. To enable each of the control lines to be wound on a respective pulley a predetermined number of turns when the pulleys are in a predetermined position, e.g. initial position, in the first winding session in which the first control line is wound in the first direction, the amount of rotation of the first pulley corresponds to the sum of the number of turns of the first control line and the number of turns of the second control line at the initial position. In the second winding session, the pulleys are wound in the opposite direction by an amount equal to the number of turns required of the second control line on the second pulley. For example, if the same number of turns are required for both the first and second control lines, the amount by which the first pulley is rotated in the first session in a first direction will be twice the number of turns the first and second pulleys are rotated in the opposite direction in the second session. Termination of each winding session may be automatically controlled by the winding controller when the desired number of turns is reached, thereby removing this task from a user which might otherwise result in some inaccuracies. In other embodiments, a user may control termination of one or both winding sessions in response to an indication through a counter or other device that measures the amount of rotation of a pulley in one session, reaching a predetermined value.

Other aspects and embodiments of the invention and benefits and features thereof are described below.

Embodiments provide a control system for cargo deployment using a controllable drag device (parachute) for aerial drop from an aircraft.

The control device may be smaller than conventional control devices in part because the control mechanism of the device is not in the load path between the controllable drag device and the cargo.

Because the control device may be smaller than conventional control devices, the controllable drag device can be placed beside the control device when packing the cargo, controllable drag device and control unit for placement in an aircraft. The arrangement enables the combination of controllable drag device and control device to occupy less volume of the allowable volume for the cargo than would otherwise be available. As a result, more volume is available for cargo.

The control device may have a modular implementation. For example the control device may have two or more modular components. In a particular implementation, a first modular component of the control device includes motors for controlling control lines attached to the controllable drag device and a second modular component of the control device includes electronic hardware/software used to control the motors, receive information to control the descent of the cargo, etc. The modular nature of the control device allows the control device, after recovery upon landing, to be detached from the controllable drag device and the discrete modular components to be carried by more than one person, thereby reducing the weight that any one person may have to carry, when compared to a control unit that is a single, non-modular unit.

In some embodiments, a harness is connected between the cargo and the controllable drag device to which the control device is detachably attached.

In a particular implementation, the modular components of the control device are coupled together and side plates on at least two opposing sides of the control device are detachably attached to the modular components. The harness is coupled to each side plate at multiple points. The attachment of the harness to the side plates can be done independently of the assembly of the modular control device. In some implementations, the connection between the side plates and control device is facilitated by a lockable quick release mechanism for easier attachment/removal of the side plates from the control device. This enables the replacement of the control device as a whole, or a modular portion of the control device in an easier fashion. The harness and side panels may be part of an integration kit.

The control unit can be utilized with round or square parachutes. A round parachute requires control of at least three, preferably four points on the canopy to control movement of the parachute in any direction. A square/rectangular parachute requires control of at least two points on the parachute to control movement of the chute in any direction.

The control device is capable of controlling two or more points on the parachute. In some implementations, the control device includes two motors that can be used to control two control lines; one control line from each motor is connected to one control point. In some implementations, the two motors can be used to control four respective control lines; two control lines from each motor are connected to a pair of control points A motor can have a single pulley hub coupled to it to allow a single control line to be controlled (reeled in or reeled out). A motor can have two pulley hubs coupled to it to allow two control lines to be controlled. For example, control lines can be wound in opposite directions on the two pulley hubs, such that when the motor rotates in one direction it causes a first control line on a first pulley hub to be reeled in, while a second control line on a second pulley hub is reeled out and when the motor rotates in the other direction it causes the first control line on the first pulley hub to be reeled out, while the second control line on the second pulley hub is reeled in.

For use with a round parachute, part of the interface kit may include two pulleys in the harness connecting the controllable drag device and the cargo, for which the wheels of the two pulleys are oriented at right angles to one another. A first riser connected to a first pair of opposite sides of the round parachute runs through a first pulley and a second riser connected to a second pair of opposite sides of the round parachute, which can be perpendicular to the first pair of opposite side, runs through a second pulley. One control line from a pair of control lines from a first motor is connected to the riser on one side of the pulley and the other control line from the pair of control lines from the first motor is connected to the riser on the other side of the pulley. The same is true for attachment to the other riser, for the other pair of control lines for a second motor. Reeling the control lines in and out moves the risers through the respective pulleys, varying the tension on the risers, which enables the parachute to move in a given direction.

For use with a square parachute, two control lines are sufficient to control the directionality of the parachute.

The control lines may include a resilient member (i.e. spring) to absorb some additional tension in the control lines that may occur subsequent to the cargo being deployed from the aircraft, for example as a result of excessive weight of the cargo or to withstand shock/stress of deployment of the controllable drag device. In some implementations for a round parachute, the risers running through a given pulley may be detachably fastened together above the pulley, at least until the controllable drag device has been deployed, to reduce additional tension on the control lines.

Assembly/disassembly of the control device, which includes one or more of: attachment/detachment of the side plates; assembly/disassembly of the module components of the control device; and assembly/disassembly of some mechanical parts of the modular components, may be achieved in a way that no tools are required to assemble/disassemble the various components.

In another aspect, an apparatus for supporting a parachute flight controller from a parachute comprises a bearing member, for example a pulley, a load-bearing coupling, for example a harness, connected to the bearing member and including a connector for connecting the coupling to a parachute flight controller. The coupling includes a load-bearing connector for connecting a payload thereto, and the bearing member is adapted to enable relative movement, controlled by the flight controller, between the bearing member and a support member, for example a flexible coupling line or web for supporting the bearing member connected between first and second suspension lines of a parachute. The flight controller may include one or more control lines connected to the support member or suspension lines which can be wound in or out of the flight controller to effect relative movement between the bearing member and the support member and thereby control the direction of the parachute.

Other aspects and embodiments of the present invention comprise any one or more features disclosed herein in combination with any one or more other features disclosed herein, and each feature may be a generic, equivalent or variant thereof.

In any of the embodiments or aspects of the invention described above, any one or more features may be omitted altogether or replaced or substituted by another feature which may be a generic, equivalent or variant thereof.

Numerous modifications to the embodiments described above will be apparent to those skilled in the art.

The invention claimed is:

1. An apparatus for supporting a parachute flight controller from a parachute, the apparatus comprising a bearing member, a load-bearing coupling connected to the bearing member, the load-bearing coupling including a connector for connecting the load-bearing coupling to a parachute flight controller, wherein the coupling includes a load-bearing connector for connecting a payload thereto, and the bearing member is adapted to enable movement, controlled by said parachute flight controller, of said bearing member along a support member for supporting said bearing member and connected between first and second suspension lines of a parachute, wherein the support member is one of an elongated flexible web, cable, line or rope and comprises a first end connected to a first suspension line and a second end connected to a second suspension line or the support member is part of the first and second suspension lines of the parachute.

2. An apparatus as claimed in claim 1, wherein said bearing member is rotatable to enable said movement along said support member and is rotatably coupled to said coupling.

3. An apparatus as claimed in claim 2, wherein said bearing member comprises a pulley wheel having a circumferential groove or channel for receiving said support member therein.

4. An apparatus as claimed in claim 1, further including said support member and wherein said support member includes a first connector for connecting the support member to said first suspension line and a second connector for connecting said support member to said second suspension line.

5. An apparatus as claimed in claim 1, wherein said bearing member comprises a first bearing member, and the apparatus further comprises a second bearing member adapted to enable movement, controlled by said parachute flight controller, of said second bearing member along a second support member for supporting said second bearing connected between third and fourth suspension lines of said parachute, and wherein said second bearing member is rotatable to enable said movement.

6. An apparatus as claimed in claim 5, wherein said first and second bearing members are angled or capable of being angled relative to each other to enable the bearing members movement along said respective first and second support members when said support members are oriented in different directions, for example, substantially orthogonal directions.

7. An apparatus as claimed in claim 5, further including said second support member.

8. An apparatus as claimed in claim 7, wherein said second support member includes a first connector for connecting the second support member to said third suspension line and a second connector for connecting said second support member to said fourth suspension line.

9. An apparatus as claimed in claim 1, wherein said connector for connecting said coupling to said parachute flight controller is adapted for releasably connecting said parachute flight controller thereto.

10. An apparatus as claimed in claim 9, wherein said connector for connecting said coupling to said parachute flight controller comprises a manually operable release member, movable between a first position which locks said connector to said parachute flight controller and a second position which enables said connector to be released from said parachute flight controller.

11. An apparatus as claimed in claim 1, in combination with the parachute flight controller, wherein the parachute flight controller includes control means for causing and limiting said movement of said bearing member along said support member.

12. An apparatus as claimed in claim 11, wherein said control means includes a first control line for applying a force on said first suspension line and a second control line for applying a force on said second suspension line and a controller for varying the length of the first and second control lines extending from said parachute flight controller.

13. An apparatus as claimed in claim 11, wherein said control means includes pulley means for accommodating at least one of (1) a control line for applying a force on said first suspension line and (2) a control line for applying a force on said second suspension line, and drive means for driving rotation of said pulley means to wind and unwind said control line about said pulley means.

14. An apparatus as claimed in claim 13, wherein said pulley means comprises first pulley means for accommodating a first control line for applying a force to said first suspension line and second pulley means for accommodating a second control line for applying a force to said second suspension line.

15. An apparatus as claimed in claim 14, including a releasable coupler for releasably coupling at least one of said first and second pulley means from said drive means.

16. An apparatus as claimed in claim 14, comprising a set of pulleys to provide said pulley means, wherein each pulley of the set includes at least a hub about which a control line is wound and at least one hub of a pulley in the set has a diameter that is different from a diameter of a hub of another pulley in the set.

17. An apparatus as claimed in claim 11, wherein said bearing member comprises a first bearing member, and the apparatus further comprises a second bearing member adapted to enable movement, controlled by said parachute flight controller, of said second bearing member along a second support member for supporting said second bearing member connected between third and fourth suspension lines of said parachute, and wherein said second bearing member is rotatable to enable said movement, and
  wherein said parachute flight controller includes means for applying a force on said third and fourth suspension lines to provide movement of said second bearing member along said second support member.

18. An apparatus as claimed in claim 17, wherein said means for applying a force comprises means for varying the length of a control line for applying a force to said third suspension line and for varying the length of a control line for applying a force to said fourth suspension line.

19. An apparatus as claimed in claim 18, wherein said means for varying the length of a control line comprises pulley means for accommodating a control line.

20. An apparatus as claimed in claim 19, wherein said pulley means comprises third pulley means for accommodating a third control line for applying a force to said third suspension line and fourth pulley means for accommodating a fourth control line for applying a force to said fourth suspension line, and drive means for driving rotation of said pulley means.

* * * * *